(12) United States Patent  (10) Patent No.: US 7,232,001 B2
Hakki et al.  (45) Date of Patent: Jun. 19, 2007

(54) COLLISION AIR BAG AND FLOTATION SYSTEM

(76) Inventors: Sam Hakki, P.O. Box 517, Bay Pines, FL (US) 33744; A-Hamid Hakki, 1508 Sturbridge Ct., Dunedin, FL (US) 34698-2260

( * ) Notice: Subject to any disclaimer, the term of this patent is extended or adjusted under 35 U.S.C. 154(b) by 0 days.

(21) Appl. No.: 11/209,141

(22) Filed: Aug. 22, 2005

(65) Prior Publication Data

US 2006/0043712 A1   Mar. 2, 2006

Related U.S. Application Data

(60) Provisional application No. 60/603,982, filed on Aug. 24, 2004.

(51) Int. Cl.
*B60K 28/00* (2006.01)
(52) U.S. Cl. .................................. 180/271; 280/735
(58) Field of Classification Search ................ 180/271; 280/735
See application file for complete search history.

(56) References Cited

U.S. PATENT DOCUMENTS

| | | | |
|---|---|---|---|
| 5,646,613 A * | 7/1997 | Cho | 340/903 |
| 5,806,888 A | 9/1998 | Adamini | |
| 5,813,694 A | 9/1998 | Jeong | |
| 5,827,996 A | 10/1998 | Yoshida et al. | |
| 5,829,777 A | 11/1998 | Sakurai et al. | |
| 5,829,778 A | 11/1998 | Wolley et al. | |
| 5,833,262 A | 11/1998 | Fujita et al. | |
| 5,842,718 A | 12/1998 | Byon | |
| 5,845,932 A | 12/1998 | Kimura et al. | |
| 5,848,803 A | 12/1998 | Tonooka et al. | |
| 5,851,023 A | 12/1998 | Nagata et al. | |
| 5,857,696 A | 1/1999 | Inoue et al. | |
| 5,865,464 A | 2/1999 | Kanuma et al. | |
| 5,871,231 A | 2/1999 | Richards et al. | |
| 5,871,233 A | 2/1999 | Tanaka et al. | |
| 5,873,598 A | 2/1999 | Yoshioka et al. | |
| 5,877,677 A | 3/1999 | Fleming et al. | |
| 5,890,736 A | 4/1999 | Sides et al. | |
| 5,893,579 A | 4/1999 | Kimura et al. | |
| 5,895,092 A | 4/1999 | Fischer | |
| 5,898,126 A | 4/1999 | Yoshida | |
| 5,899,485 A | 5/1999 | Folsom et al. | |
| 5,909,895 A | 6/1999 | Iino et al. | |
| 5,911,434 A | 6/1999 | Townsend | |
| 5,916,687 A | 6/1999 | Takanashi et al. | |
| 5,918,899 A | 7/1999 | Watanabe | |

(Continued)

*Primary Examiner*—Faye M. Fleming
(74) *Attorney, Agent, or Firm*—Frijouf, Rust & Pyle, P.A.

(57) ABSTRACT

A pre-impact inflation air bag system for a vehicle having a preselected decreasing distance between the vehicle and an object is disclosed. The system comprises a plurality of nested inflatable air bags. A plurality of inflators are provided for inflating the plurality of nested inflatable air bags, respectively. A collision sensor produces a collision sensor output upon detecting the object with the preselected decreasing distance between the vehicle and the object. A controller receives the collision sensor output for simultaneously inflating each of the plurality of nested inflatable air bags between vehicle and an object. A plurality of pressure relief members are connected to the plurality of nested inflatable air bags for sequentially deflating the plurality of nested inflatable air bags upon sequential impact of the plurality of nested inflatable air bags with the object.

21 Claims, 12 Drawing Sheets

U.S. PATENT DOCUMENTS

| | | |
|---|---|---|
| 5,921,287 A | 7/1999 | Bowen et al. |
| 5,931,498 A | 8/1999 | Keshavaraj |
| 5,934,701 A | 8/1999 | Furukawa |
| 5,938,236 A | 8/1999 | Tanaka et al. |
| 5,944,341 A | 8/1999 | Kimura et al. |
| 5,944,344 A | 8/1999 | Yoshioka et al. |
| 5,945,359 A | 8/1999 | Graham |
| 5,947,511 A | 9/1999 | Usui et al. |
| 5,951,041 A | 9/1999 | Iwai et al. |
| 5,951,043 A | 9/1999 | Mooney et al. |
| 5,961,142 A | 10/1999 | Shiraki et al. |
| 5,964,478 A | 10/1999 | Stanley et al. |
| 5,967,545 A | 10/1999 | Iijima et al. |
| 5,971,427 A | 10/1999 | Whited et al. |
| 5,988,674 A | 11/1999 | Kimura et al. |
| 5,996,721 A | 12/1999 | Winner |
| 5,997,032 A | 12/1999 | Miwa et al. |
| 6,003,938 A | 12/1999 | Lachat et al. |
| 6,010,149 A | 1/2000 | Riedel et al. |
| 6,012,735 A | 1/2000 | Gray et al. |
| 6,017,056 A | 1/2000 | Lee |
| 6,019,387 A | 2/2000 | Jost |
| 6,027,138 A | 2/2000 | Tanaka et al. |
| 6,029,996 A | 2/2000 | Yoshioka et al. |
| 6,039,342 A | 3/2000 | Sasaki |
| 6,045,151 A | 4/2000 | Wu |
| 6,050,596 A | 4/2000 | Boerger |
| 6,050,600 A | 4/2000 | Yoshida |
| 6,053,531 A | 4/2000 | Katsuda et al. |
| 6,056,336 A | 5/2000 | Balgobin |
| 6,062,594 A | 5/2000 | Asano et al. |
| 6,062,596 A | 5/2000 | Boydston et al. |
| 6,065,771 A | 5/2000 | Kawakubo et al. |
| 6,074,003 A | 6/2000 | Umezawa et al. |
| 6,095,557 A | 8/2000 | Takimoto et al. |
| 6,095,602 A | 8/2000 | Umezawa et al. |
| 6,106,002 A | 8/2000 | Haesaert et al. |
| 6,113,133 A | 9/2000 | Iijima et al. |
| 6,113,141 A | 9/2000 | Baker |
| 6,120,058 A | 9/2000 | Mangum et al. |
| 6,126,192 A | 10/2000 | Enders |
| 6,126,197 A | 10/2000 | Muir et al. |
| 6,127,564 A | 10/2000 | Yoshida et al. |
| 6,129,377 A | 10/2000 | Okumura et al. |
| 6,129,382 A | 10/2000 | Tonooka |
| 6,134,806 A | 10/2000 | Dhaemers |
| 6,142,508 A | 11/2000 | Lewis |
| 6,142,520 A | 11/2000 | Iino et al. |
| 6,152,480 A | 11/2000 | Iwanaga |
| 6,155,593 A | 12/2000 | Kimura et al. |
| 6,155,600 A | 12/2000 | Reynolds et al. |
| 6,168,191 B1 | 1/2001 | Webber et al. |
| 6,168,201 B1 | 1/2001 | Takeyama et al. |
| 6,170,865 B1 | 1/2001 | Barron |
| 6,175,794 B1 | 1/2001 | Muraoka |
| 6,180,204 B1 | 1/2001 | Keshavaraj |
| 6,186,543 B1 | 2/2001 | Yamaji et al. |
| 6,186,714 B1 | 2/2001 | Berrier et al. |
| 6,193,271 B1 | 2/2001 | Shimane |
| 6,199,901 B1 | 3/2001 | Iizuka |
| 6,206,408 B1 | 3/2001 | Schneider |
| 6,206,417 B1 | 3/2001 | Soerquist et al. |
| 6,209,911 B1 | 4/2001 | Igawa et al. |
| 6,224,101 B1 | 5/2001 | Nishijima et al. |
| 6,227,325 B1 | 5/2001 | Shah |
| 6,231,069 B1 | 5/2001 | Yokoyama |
| 6,234,517 B1 | 5/2001 | Miyahara et al. |
| 6,234,518 B1 | 5/2001 | Ryl et al. |
| 6,244,624 B1 | 6/2001 | Kumagai |
| 6,245,695 B1 | 6/2001 | Maruo et al. |
| 6,247,724 B1 | 6/2001 | Jambor et al. |
| 6,254,130 B1 | 7/2001 | Jayaraman et al. |
| 6,260,878 B1 | 7/2001 | Tanase |
| 6,273,464 B2 | 8/2001 | Tokuda et al. |
| 6,276,717 B1 | 8/2001 | Katsuda et al. |
| 6,283,507 B1 | 9/2001 | Kami et al. |
| 6,286,863 B1 | 9/2001 | Kamiji et al. |
| 6,299,196 B1 | 10/2001 | Suzuki et al. |
| 6,302,431 B1 | 10/2001 | Sasaki et al. |
| 6,305,708 B2 | 10/2001 | Davis et al. |
| 6,325,412 B1 | 12/2001 | Pan |
| 6,327,759 B1 | 12/2001 | Keshavaraj et al. |
| 6,334,245 B2 | 1/2002 | Katsuda et al. |
| 6,338,499 B2 | 1/2002 | Ueno et al. |
| 6,340,171 B1 | 1/2002 | Hirth et al. |
| 6,340,175 B1 | 1/2002 | Hughes et al. |
| 6,341,797 B1 | 1/2002 | Seo |
| 6,345,841 B2 | 2/2002 | Igawa et al. |
| 6,355,123 B1 | 3/2002 | Baker et al. |
| 6,357,786 B1 | 3/2002 | Higashi |
| 6,361,072 B1 | 3/2002 | Barnes |
| 6,364,346 B1 | 4/2002 | Preisler et al. |
| 6,364,354 B1 | 4/2002 | Nakashima et al. |
| 6,378,896 B1 | 4/2002 | Sakakida et al. |
| 6,378,898 B1 | 4/2002 | Lewis et al. |
| 6,382,660 B1 | 5/2002 | Starner et al. |
| 6,382,662 B1 | 5/2002 | Igawa |
| 6,386,577 B1 | 5/2002 | Kan et al. |
| 6,394,486 B1 | 5/2002 | Fujimura et al. |
| 6,394,491 B2 | 5/2002 | Soderquist et al. |
| 6,408,237 B1 | 6/2002 | Cho |
| 6,412,815 B1 | 7/2002 | Nakashima et al. |
| 6,416,599 B1 | 7/2002 | Yoshikawa et al. |
| 6,425,601 B1 | 7/2002 | Lewis |
| 6,435,549 B1 | 8/2002 | Ochiai |
| 6,439,605 B2 | 8/2002 | Ariyoshi |
| 6,444,596 B1 | 9/2002 | Hirai et al. |
| 6,457,739 B1 | 10/2002 | Dailey et al. |
| 6,457,741 B2 | 10/2002 | Seki et al. |
| 6,460,879 B2 | 10/2002 | Tanase et al. |
| 6,460,884 B1 | 10/2002 | Nakashima et al. |
| 6,464,249 B1 | 10/2002 | Lacroix |
| 6,467,563 B1 | 10/2002 | Ryan et al. |
| 6,468,369 B1 | 10/2002 | Zhou |
| 6,471,238 B2 | 10/2002 | Ishikawa et al. |
| 6,473,948 B1 | 11/2002 | Keshavaraj et al. |
| 6,474,679 B2 | 11/2002 | Miyasaka et al. |
| 6,474,686 B1 | 11/2002 | Higuchi et al. |
| 6,478,329 B1 | 11/2002 | Yokoyama |
| 6,481,743 B1 | 11/2002 | Tobe et al. |
| 6,491,320 B1 | 12/2002 | Nakashima et al. |
| 6,494,484 B2 | 12/2002 | Bosgieter et al. |
| 6,497,183 B2 | 12/2002 | Demarquily et al. |
| 6,497,302 B2 | 12/2002 | Ryan |
| 6,497,774 B2 | 12/2002 | Yamato et al. |
| 6,502,856 B1 | 1/2003 | Shaklik et al. |
| 6,511,081 B2 | 1/2003 | Yamazaki et al. |
| 6,512,308 B2 | 1/2003 | Boezen et al. |
| 6,520,532 B2 | 2/2003 | Kobayashi et al. |
| 6,520,538 B2 | 2/2003 | Katsuda et al. |
| 6,523,855 B2 | 2/2003 | Musiol et al. |
| 6,527,886 B1 | 3/2003 | Yamato et al. |
| 6,533,318 B2 | 3/2003 | Yamaji et al. |
| 6,543,803 B1 | 4/2003 | Harada et al. |
| 6,547,274 B2 | 4/2003 | Ochiai |
| 6,547,275 B2 | 4/2003 | Nakashima et al. |
| 6,547,279 B1 | 4/2003 | Amamori |
| 6,554,313 B2 | 4/2003 | Uchida |
| 6,557,888 B1 | 5/2003 | Nakashima et al. |
| 6,561,539 B1 | 5/2003 | Sunabashiri et al. |
| 6,562,161 B1 | 5/2003 | Yamato et al. |
| 6,568,706 B2 | 5/2003 | Mueller |
| 6,578,866 B2 | 6/2003 | Higashi |
| 6,585,290 B2 | 7/2003 | Pinsenschaum et al. |

| | | |
|---|---|---|
| 6,598,901 B2 | 7/2003 | Nakashima et al. |
| 6,601,614 B1 | 8/2003 | Ishii |
| 6,612,610 B1 | 9/2003 | Aoki et al. |
| 6,626,459 B2 | 9/2003 | Takimoto et al. |
| 6,631,921 B1 | 10/2003 | Drossler et al. |
| 6,632,388 B1 | 10/2003 | Sanae et al. |
| 6,634,669 B2 | 10/2003 | Levine |
| 6,648,368 B2 | 11/2003 | Smith et al. |
| 6,655,713 B2 | 12/2003 | Tanase et al. |
| 6,669,230 B1 | 12/2003 | Katsuda et al. |
| 6,672,339 B2 | 1/2004 | Keshavaraj et al. |
| 6,672,616 B2 | 1/2004 | Jonsson et al. |
| 6,676,147 B2 | 1/2004 | Ozaki et al. |
| 6,679,521 B2 | 1/2004 | Yamazaki et al. |
| 6,685,215 B2 | 2/2004 | Keshavaraj |
| 6,685,219 B1 | 2/2004 | Yamaji et al. |
| 6,692,019 B2 | 2/2004 | Sommer |
| 6,695,346 B1 | 2/2004 | Keshavaraj |
| 6,696,933 B2 | 2/2004 | Cooper |
| 6,702,321 B2 | 3/2004 | Thoma |
| 6,709,006 B2 | 3/2004 | Okamoto |
| 6,715,790 B2 | 4/2004 | Breed |
| 6,719,323 B2 | 4/2004 | Kai et al. |
| 6,722,691 B1 | 4/2004 | H.ang.land et al. |
| 6,722,694 B1 | 4/2004 | Nakashima et al. |
| 6,733,022 B2 | 5/2004 | Bradshaw et al. |
| 6,733,032 B2 | 5/2004 | Pinsenschaum et al. |
| 6,736,455 B1 | 5/2004 | Zakovic et al. |
| 6,739,619 B2 | 5/2004 | Mueller |
| 6,742,804 B2 | 6/2004 | Suzuki et al. |
| 6,767,030 B2 | 7/2004 | Yamaji et al. |

\* cited by examiner

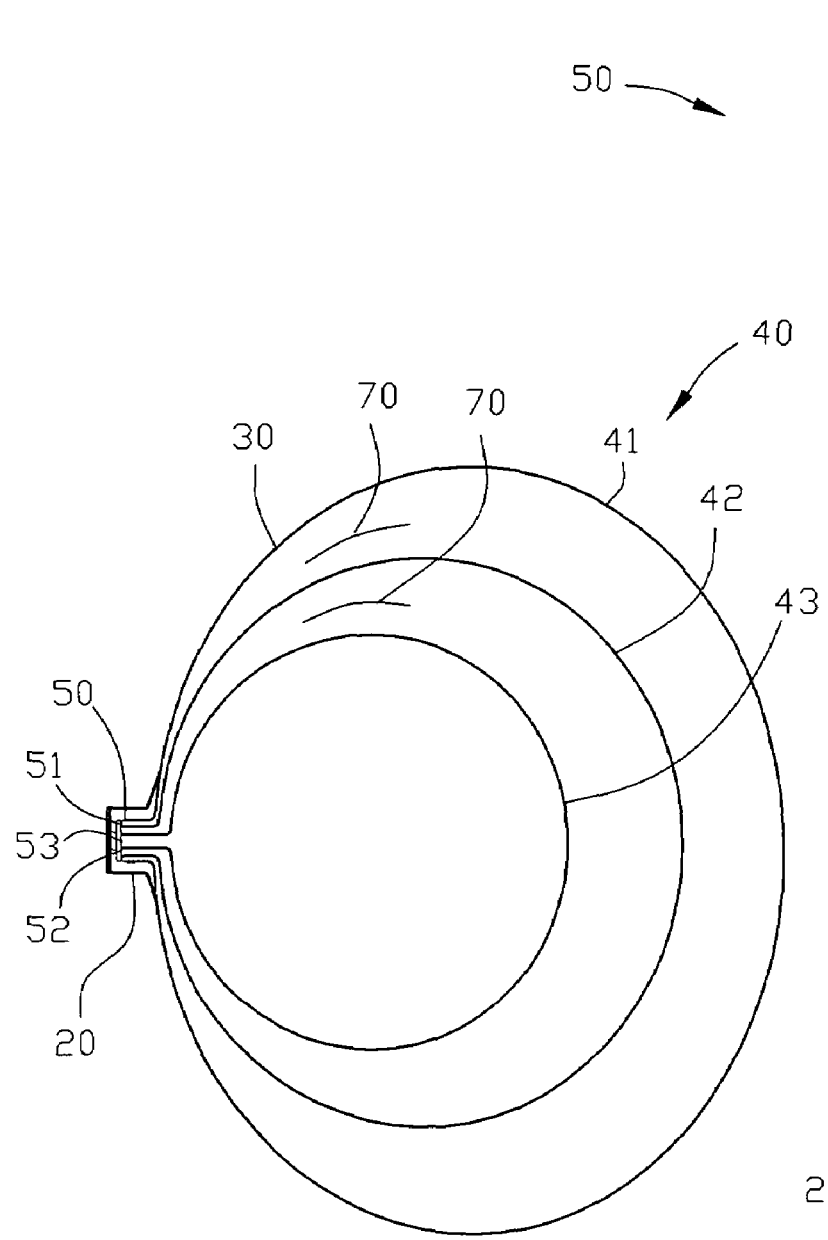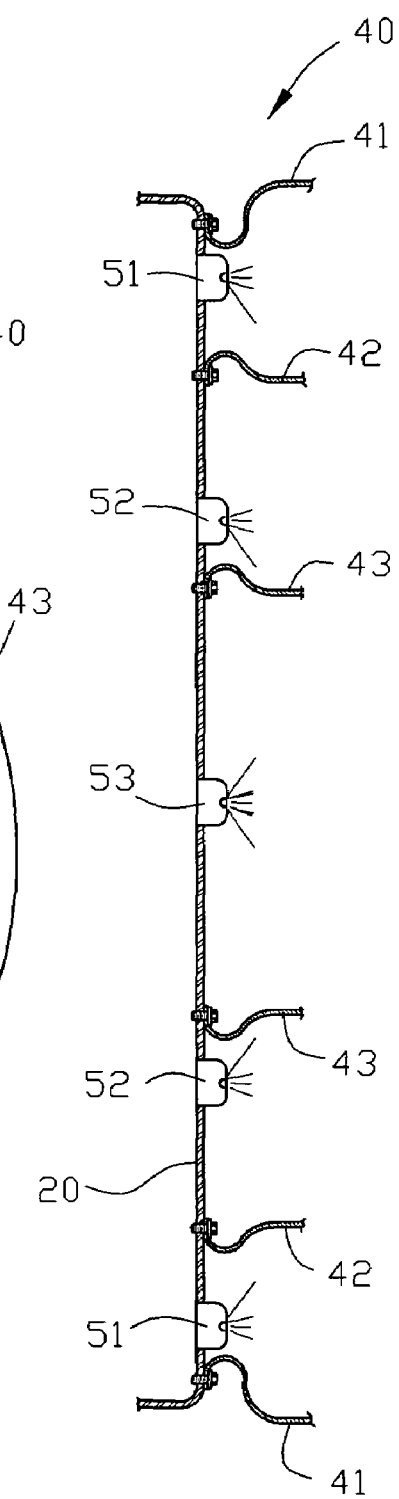
FIG. 3
FIG. 4

COLLISION AIR BAG AND FLOTATION SYSTEM

CROSS-REFERENCE TO RELATED APPLICATIONS

This application claims benefit of U.S. provisional application Ser. No. 60/603,982 filed Aug. 24, 2004. All subject matter set forth in provisional application Ser. No. 60/603,982 is hereby incorporated by reference into the present application as if fully set forth herein.

BACKGROUND OF THE INVENTION

1. Field of the Invention

This invention relates to a vehicle safety systems, and more particularly to an improved collision air bag and flotation system for a land vehicle, air or marine vehicle or craft.

2. Background of the Invention

Air bags work in conjunction with lap and shoulder belts to protect the passengers of a vehicle involved in rapid deceleration, as in an impact with a fixed object or another vehicle. Frontal impact air bags are designed to prevent serious injury by keeping the occupant head and chest of the occupant from impacting the steering wheel, dashboard or windshield. In serious impacts, as the front end of a vehicle crushes, the occupants continue to move forward, even with lap and shoulder belts. The air bag provides another level of protection in these events.

A conventional air bag systems used for motor vehicles generally include an inflatable folded air bag, a collision sensor for sensing the collision of the vehicle and for generating a collision sensing signal. An electronic control unit receives the collision signal and controls the operation of the airbag by signaling an inflator to inject gas or air into the folded air bag. The air bag is deployed and inflates against the occupant of the vehicle. Typically, the collision sensor is mounted to the forefront of the vehicle. Upon collision of the vehicle with another vehicle or object, the collision sensor will receive the shock of the impact and generates a collision sensing signal to the electronic control unit. When the collision sensing signal exceeds a certain preset value, the electronic control unit provides the inflator with the air bag expansion triggering signal.

An ignitable gas generating material is included within the inflator. An explosion of the ignitable gas generating material supplies gas to inflate the folded air bag. However, minute particles and molten materials from combustion products resulting from the combustion of ignitable gas generating material may be discharged from the air bag into the inside of the vehicle causing contamination of the air within the vehicle. Metal and ceramic filters serve to eliminate such undesired contaminants. In order to minimize the effect of high temperature and high pressure in the moment of air bag inflation, a tortuous gas flow passage is formed within the chamber to lower temperature and pressure, and minimize the likelihood of burns and secondary shock to the occupants of the vehicle.

Ninety percent (90%) of the accidents resulting in air bag deployments occur at impact velocities of 30 miles per hour or less, with about 80% occurring below 20 miles per hour. U.S. Federal Government safety regulations require that air bags in motor vehicles protect unbelted front seat passengers with the vehicle traveling 30 miles per hour at impact. These strict requirements have led to the installation of aggressive rapid deployment air bags. Since an inflating air bag introduces additional energy into a collision, air bags have, in some instances caused injury to passengers of vehicles. The most serious injuries have been to infants and small children. These injuries caused new requirements to be established in which include switches to disable air bag actuation for passenger seats and ensuring that infants and children are seated in the rear seats of vehicles.

Conventional air bags are manufactured by sewing a plurality of given shaped cloths cut out of a woven fabric. Open weave construction may inflict burns due the hot inflating gas which passes through an opened weave structure. This depends on the specific gas permeability of the fabric. A hollow weave air bag is formed by joining two pieces of fabric by the bind stitch weave to form a circumferential joint. It is known that very coarse, stiff and dense weave construction could injure the occupants. In addition, the gas permeability was taken into consideration to avoid occupant rebound.

An air bag deployment system external to the passenger compartment and capable of absorbing the energy of a collision would significantly reduce the number of air bag related injuries. Some examples of the prior art to provide more effective and safer air bags and air bag deployment systems are illustrated in the following U.S. patents.

U.S. Pat. No. 3,588,142 to Gorman discloses a safety device whereby a shield of resilient material is rapidly formed to protect an occupant of a vehicle in the event of rapid deceleration or imminent collision. Formation of the shield may be automatic, being controlled by suitable instruments of the vehicle, but may alternatively or in addition be manually actuated. The shield is an expandable element which is rapidly expanded to its operative position by a prepressurized filler material when actuated, being normally held in a retracted position by release means. The shield may be positioned wholly or partly to surround portions of the body of an occupant of the vehicle, or may be provided exteriorly of the vehicle to cushion impact on collision.

U.S. Pat. No. 3,708,194 to Amit discloses a safety apparatus in which an inflatable is provided for the front of an automobile to provide a cushion for the vehicle and its passengers during a collision. The inflatable is connected to a supply of compressed fluid and is enclosed by a cover during non-use; which is adapted to be detachably opened upon inflation of the inflatable. The supply of compressed fluid can also be utilized for fire extinguishing purposes.

U.S. Pat. No. 3,822,076 to Mercier et al. discloses a fluid energy absorbing buffer device for a motor vehicle, of the type comprising a bag or bladder adapted to be inflated instantaneously. The inflatable bag is folded in its inoperative condition in a cavity provided to this end on the front and/or rear portions of the vehicle, so as to be adapted to react against the chassis or any, other reinforced portion of the vehicle structure. The inflation of the bag is through means known per se being determined by detector members projecting from the vehicle body. The detector members are normally retracted at zero or low vehicle speeds.

U.S. Pat. No. 4,869,538 to Presley discloses a bumper-like member for a vehicle that surrounds the vehicle, formed of a closed flexible, hollow container with a tube or bladder filled with compressed air. The air-filled encompassing bumper is attached to a backing plate. The backing plate is attached to a supporting brace which is mounted to the frame of an automobile employing a rubber spacer to further absorb impact energy. Compressed air for the bumper unit(s) is supplied through a shraeder valve appendage. This surrounding unit serves as a safety device by providing a significant amount of flotation to allow passenger(s) escape if the vehicle enters deep water.

U.S. Pat. No. 4,996,936 to Brundritt discloses a buoyant support for a watercraft comprising a rigid, elongated support surface, and an inflatable member folded along its length in a substantially deflated condition to form a relatively compact, resilient mass secured to and overlaying the surface. A cover or the like retains the inflatable member in its folded, overlaying condition. In an emergency the inflatable member is inflated to provide the buoyant support. In the folded condition the device may act as a fender for the watercraft.

U.S. Pat. No. 5,338,061 to Nelson, et al. teaches an air bag for use in connection with a gas generator. The air bag is of a double-wall construction. The air bag is fitted to the housing of a gas generator and a gas jet opening for allowing the air bag to communicate with the housing. A gas generated by the gas generator due to an impact is charged into the air bag. The air bag has a double-wall structure including a first air bag and a second air bag having a greater capacity than the first air bag disposed about and attached to the first air bag. The first air bag constitutes an air storage chamber which receives air from the atmosphere through an air intake path and stores the air. A gas storage chamber is formed between the first and second air bags which receives a combustion gas from the gas jet opening and temporarily stores the combustion gas. The air intake path is typically a hollow path between the atmosphere and the air storage chamber. The first air bag has an opening therein which establishes communication between the gas storage chamber and the air storage chamber.

U.S. Pat. No. 5,431,463 to Chou teaches an air cell bumper device including a mounting base mounted on a mounting track being fixed to the body of a motor vehicle. A rubber air bag is fastened to the mounting base for impact protection. The rubber air bag has an inflatable big air bag and small air-tight air bags separated around the big air bag by partition walls, and whereby when the rubber air bag is compressed by an impact, the partition walls will be torn permitting air to rapidly move from the big air chamber into the small air chamber to buffer the impact.

U.S. Pat. No. 5,461,357 to Yoshioka, et al. discloses an obstacle detection device for a vehicle including an area determining section for determining a detection area extended forward of a running vehicle and provided for detecting an obstacle. A split section is provided for splitting the area into a plurality of small split zones and a detecting section is provided for detecting an obstacle in each of the small split zones. An inferring section is provided for an inferring a path of the vehicle in the obstacle detection area, and a judging section for judges a rank of danger of an obstacle in the detection area. The obstacle can be properly detected so that the vehicle can take a responsive and appropriate action for avoiding the obstacle.

U.S. Pat. No. 5,489,117 to Huber teaches an occupant restraint system incorporating a cushion structure or air bag having an impermeable external wall and a permeable internal wall with gas passageways therebetween. The air bag is mounted on a pair of gas manifolds having manifold gas ports communicating with the gas passageways in the air bag. Gas generator units are secured to the manifolds and are actuatable through impact signals to create high pressure gas directed through generator nozzles into the manifolds and subsequently into the gas passageways of the air bag. A valve plate supports a plurality of inlet reed valves operating in conjunction with a corresponding plurality of inlet ports to admit ambient air from within the vehicle into the expanding air bag; a pair of bi-level exhaust valves permit the escape of high pressure gas and air from within the air bag into the vehicle interior upon completion of the deployment of the air bag. The exhaust valves restrict the rate of exit of the gas and air from within the air bag when an increase in the internal air bag pressure occurs such as caused by occupant impact.

U.S. Pat. No. 5,542,695 to Hanson discloses an inflatable air bag with a plurality of air valves and at least one internal, gas-operated extension member for deploying the bag, with three such members being preferred. The extension members are generally tubular, being inside the bag. Each is attached at its first, base end to a gas source, its second end being free. Prior to deployment of the air bag, the extension members are compactly within the bag. On demand, a gas source is activated to inflate the extension members, straightening each quickly into a substantially straight, elongated pressurized tube expanding the bag. Ambient air from the passenger compartment of the vehicle flows rapidly into the bag as it expands to create an impact-absorbing cushion.

U.S. Pat. No. 5,568,903 to Pena, et al. discloses a safety airplane comprising a carrier portion and a saddle portion. An assembly is provided for retaining the saddle portion on the carrier portion. A structure is disclosed for releasing the saddle portion from the carrier portion, when there is a problem during flight. Paraphernalia is set forth for gently lowering the saddle portion to the ground.

U.S. Pat. No. 5,646,613 to Cho discloses a system for minimizing automobile collision damage using radiant energy detectors and externally deployed air bags for aiding in damage reduction of automobile collisions. This system includes radiant energy detectors, such as radars, with transmitters and receivers, a computer, and energy absorbing inflation devices, air bags. Optionally, the system may be adapted to provide warnings and control vehicle functions, such as braking and disengaging the drive train. A dashboard link allows the computer to determine speed, steering and other conditions of the automobile, while the radiant energy detectors provide the computer with information of the object (e.g., another vehicle, pedestrian, or inanimate item) of imminent collision. The computer, using the information provided will determine at what time a ensuing collision will occur, and establish a minimal allowable time window to deploy the inflation device. The inflation device or air bag provides an energy absorbing and diverting buffer between the automobile and the object of imminent collision. The computer uses minimal allowable time window to deploy the air bag automatically, allowing the control of the automobile to remain with the driver such that necessary evasive measures can be taken. Once the imminent collision reaches the minimal allowable time window, the computer initiates a control signal deploying the external air bag. Once deployed, the external air bag reduces the amount of physical damage to the automobile, resulting in less injury, and repair costs.

U.S. Pat. No. 5,725,265 to Baber discloses a new air bag system for vehicle bBumpers for absorbing the impact of a collision, thus minimizing damage and preventing serious injuries. The inventive device includes a containment member having a hollow interior and being securable to the front or the rear of a vehicle, and an air bag enclosed within the hollow interior of the containment member, wherein the air bag is inflatable and deployable when the containment member is impacted by an object, such as another vehicle. An inflation system is provided for inflating and deploying the air bag outwardly from the containment member and a triggering system is provided for triggering the inflation system when the containment member is impacted. A control system is operably connected to the triggering system, the inflation system, and the air bag for controlling inflation and deployment of the air bag.

U.S. Pat. No. 5,810,293 to Leeki-Woo teaches an emergency landing auxiliary apparatus of an aircraft using a parachute, whereby a rapid accident crash of an aircraft can be avoided through releasing the chute set inside an apparatus accepting room and the landing distance of the aircraft can be reduced in case of an emergency landing. The emergency landing auxiliary apparatus claims to be effective in decreasing a possible loss of lives and the damage of the aircraft itself. When a relay switch is pushed, the DC current produced in a DC generator is applied to a timer via an overvoltage, overcurrent preventer so as to operate the timer in several seconds and drive a speed reduction motor, the worm turns to rotate the worm gear in 90-degree arc, so that the leg of the cover is in a ready state not to be released out of the 90-degree arc turned cam, when the operation of the timer is suspended for several seconds, a power interrupt detector detects the interrupted operation and immediately supplies an electric power to the detonator, whereby the compressed air of the compressed air tank is released through the hole of a casing, the cover rushes out of the apparatus accepting room and the parachute is released so as to support the emergency landing of the aircraft.

U.S. Pat. No. 5,810,427 to Hartmann, et al discloses a motor vehicle having a rigid vehicle body structure with a compartment for passengers and payload. The vehicle body structure has a front, a back, and sides. An exterior skin is connected to the vehicle body structure and includes a plurality of aerial exterior skin portions. At least one impact protection unit is connected to the vehicle body structure and one of the aerial exterior skin portions for moving the one exterior skin portion from a retracted position at the vehicle body structure into an extended position in which a base surface area defined by the outer contour of the motor vehicle is enlarged. The impact protection unit upon impact reduces a deceleration of the compartment due to a movement of the impact protection unit toward the vehicle body structure.

U.S. Pat. No. 5,959,552 to Cho discloses a system for minimizing roadway vehicle damage and personal injury which includes a detection sensor unit, a computer processing unit (CPU), and energy absorbing inflation devices. The detection sensor unit, which is mounted on the roadway vehicle to detect the speed, distance and direction of a potential obstacle, includes a transmitter for transmitting signals and a directional receiver to receive signals reflected by the potential obstacle and generates an electronic signal in response thereto. The CPU, which receives information on the speed and direction of the roadway vehicle and receives signals from the detection sensor unit continuously processes the information and signals and calculates changes in the speed, distance and direction of the potential obstacle with respect to the roadway vehicle. The CPU generates a control signal upon calculation of an imminent collision situation, which calculation is based on a predetermined minimum allowable time window. The minimum allowable time window is generally defined as a time period during which a driver of the roadway vehicle is unable to take evasive action, such as braking or turning the steering wheel, to avoid a collision situation. Each of the energy absorbing inflation devices includes an electronically controlled valve, with at least one of the energy absorbing inflation devices being responsive to the control signal. An external air bag is coupled to the valve of one of the energy absorbing inflation devices and an internal air bag is coupled to the valve of another of the inflation devices, such that upon calculation by the CPU of the imminent collision situation based on the predetermined minimum allowable time window, the CPU transmits the control signal to one of the energy absorbing inflation devices to deploy the air bags prior to the time of actual collision.

U.S. Pat. No. 6,056,336 to Balgobin teaches an external air bag assembly for mounting in a cavity in a bumper of a vehicle. The assembly includes an air bag and deployable shock-absorbing bumper assembly contained within the air bag. In a retracted state, the bumper assembly projects outward only a limited degree. When released in conjunction with air bag deployment, the bumper assembly expands forward and forms an additional shock-absorbing region. Because both the air bag and the bumper assembly are stored in an undeployed and retracted state, the entire assembly has a low profile while still providing a high degree of impact absorbing protection.

U.S. Pat. No. 6,106,038 to Dreher discloses a collision damage reduction system to reduce contact velocities between a vehicle and a collidant by use of air bags on the exterior of the vehicle. The vehicle operator or an automatic collision imminence detection system e.g. radar, sonar, or an accelerometer and controller actuates a switch that actuates the air bag inflators when a collision is perceived imminent. The switch or controller can also interrupt vehicle motive power and actuate the brakes. The air bag has vents and shapes to steer it and its collidants. The controller can also actuate vehicle horns and lights to warn collidants when imminent collisions are detected.

The system Dreher describes for collision damage reduction triggered by sensors prior to impact. The system reduces contact velocities between a vehicle and an object by use of air bags on the exterior of the vehicle. A detailed analysis of the physics of the exterior air bags applying Newton's Law of Motion (Force=Mass×Acceleration) is applied to the system design. The area of the bag contact on the front of the vehicle times the bag pressure equals the force on the vehicle. The force on the vehicle divided by its mass equals its deceleration or rate of reduction of velocity per unit time. Therefore, as the bag compresses, the vehicle decelerates, taking longer to compress each subsequent length of the air bag. Thus the velocity of the vehicle drops exponentially with length of air bag compression. Dreher also noted that with each air bag compression, the gas pressure inside the bag rises inversely proportional to the remaining space in the bag in an exponential manner with each length compression of the bag. When reduced to practice, an un-vented air bag slows a vehicle at a fast and exponential rate. A rapid rate of deceleration produces severe effects on the occupants of a rapidly decelerating vehicle. These effects include the compression of vital organs, such as the brain and heart, which may result in severe injury and death. Rates of deceleration exceeding 18 g's are not tolerated by humans.

A mathematical model is presented, using an exterior air bag measuring 5 feet in length and 4 feet in width and 2.5 feet high, mounted on a 3,000 pound motor vehicle, including passengers, colliding with an immovable object. A silicone rubber coated fabric air bag with no holes in order to hold the initial bag pressure is described. The system includes two pressure relief valves to expel gas when the compression is under way. Starting at in initial inflation pressure of 15 psig., as long the bag pressure stays below 62 psig on a 3,000 lb motor vehicle with 6 square feet of frontal area, the car deceleration stays under 18 g's. Weakly sewn pieces of fabric (0.4 and 0.3 square foot patch) act as relief valves at pressures of 30 and 40 psig. A major drawback of the design is that it may take 200 milliseconds to fully inflate the airbags for an average vehicle.

U.S. Pat. No. 6,209,909 to Breed teaches a variable inflation rate inflator system for inflating one or more airbags including an inflator for releasing a gas into the airbag(s). A first anticipatory crash sensor determines that a crash requiring an airbag will occur based on data obtained prior to the crash and, upon the making of such a determination, triggering the inflator means to release gas into the airbag to thereby inflate the same at a first inflation rate. A second crash sensor determines that a crash requiring an airbag will occur or is occurring and, upon the making of such a determination, affecting the inflator such that an additional quantity of gas is released thereby into the airbag to thereby inflate the airbag at a second inflation rate greater than the first inflation rate. Also, an airbag passive restraint system for protecting an occupant sitting in the seat adjacent the side door is disclosed which includes at least one airbag arranged to be inflated between the occupant and the side door. A sensor is provided for detecting that a crash requiring deployment of the airbag is required and an inflator for releasing a gas into the airbag to inflate the same and which is triggered by the sensor to release gas into the airbag in response to the detection by the sensor of a crash requiring deployment of the airbag. A system for permitting the occupant to be displaced away from the side door upon inflation of the airbag and thereby increase the space between the occupant and the side door is described.

U.S. Pat. No. 6,213,496 to Minami, et al. discloses an airbag device formed of a retainer having a center opening, an air bag, and at least one inflator fixed to the retainer. The air bag includes an outer bag having an outer bag opening, and an inner bag arranged inside the outer bag and having an inner bag opening. The peripheries of the outer and inner bag openings are directly or indirectly fixed to the retainer so that the inner bag communicates with an outside through the outer bag opening and the center opening. The inflator has a main body containing a gas generating agent therein and faces a space between the outer and inner bags to directly supply gas to the space when the inflator is actuated. When the gas is supplied to the space between the outer and inner bags, air is inspired into the inner bag through the center opening.

U.S. Pat. No. 6,213,502 to Ryan, et al. discloses an air bag module for inflating an air bag cushion at variable rates in response to rapid deceleration of a motor vehicle. The air bag module includes an inflator for generating inflator gas to inflate an air bag cushion upon the sensing rapid deceleration of a vehicle. An annular cushion retainer is disposed about the inflator for directing gases from the inflator to the air bag cushion. The cushion retainer includes an annular cavity in fluid communication with the air bag cushion by a vent opening to selectively direct gas away from the air bag cushion during a reduced level of deployment. A controller generates an ignition signal to the inflator in response to velocity responsive sensors. In response to the ignition signals, the inflator releases an appropriate predetermined volume of gas into the air bag cushion. The level of deployment or inflation of the air bag cushion is dependent on the actuation of a slide actuator assembly arranged to selectively block the vent opening of the cushion retainer to restrict or block gas flow directed away from the air bag cushion to the exterior of the air bag module.

U.S. Pat. No. 6,224,019 to Peterson, et al. discloses a gas-powered landing velocity attenuator for reducing the final descent velocity (and consequent ground impact load) of a parachutist or parachuted cargo. Immediately prior to impact, the gas source powers a device for drawing the load (either a parachutist or cargo) closer to the canopy of the paracute. In a first preferred embodiment, the load and the canopy are brought closer together by a single action piston and cable assembly powered by the gas source. A second embodiment uses an inflator assembly connected to an air bag or a braided tube to decrease the distance between the load and the parachute canopy.

U.S. Pat. No. 6,227,325 to Shah teaches external inflatable safety bags which are adaptable for a variety of conveyances. A sensing means determines the speed and distance between the conveyance and an obstacle or another conveyance for selectively providing a warning signal to the driver to avoid a collision or to deploy the safety bags automatically when collision is imminent. The safety bags provide impact absorption as well as aerodynamic breaking of the speed of the conveyance.

U.S. Pat. No. 6,260,878 to Tanase teaches an air bag for a side air bag device folded and accommodated over a roof side rail portion on the peripheral edge of an opening in an interior side of a vehicle. The air bag is developed and expanded to cover the opening when an inflating gas flows in. In the air bag, the internal pressure of the inflating gas at three seconds after the start of inflow is maintained at 30% or more of the internal pressure at 500 milliseconds after the start of inflow. This air bag can maintain the high internal pressure for a long time.

U.S. Pat. No. 6,357,786 to Higashi teaches an air bag system in which leakage of gas generated by an inflator through an insertion opening formed at a mounting base portion of an air bag is prevented reliably. The air bag system has the air bag in which the inflator for generating gas for inflating and deploying the air bag is mounted through the insertion opening formed at the mounting base portion of said air bag. The air bag system has an applied cloth mounted to an outside of the air bag such that the insertion opening for the inflator is covered with the applied cloth by making one side of the applied cloth an open hole and fixing edges of three other sides of the applied cloth to an outside face of the mounting base portion.

U.S. Pat. No. 6,382,662 to Igawa teaches an air bag formed of an outer bag and an inner bag situated inside the outer bag. The inner bag has upper and lower flow-out ports positioned on a driver's side relative to a plane of a steering wheel when the inner bag is expanded. Since an opening area of the lower flow-out port is larger than that of the upper flow-out port, a large quantity of gas in the inner bag is discharged in the lower direction through the flow-out port. As a result, the outer bag quickly expanded in the lower direction rather than in the upper direction, and quickly enters a narrow space between a driver and the steering wheel.

U.S. Pat. No. 6,408,237 to Cho teaches an air bag system for an automobile including an external detection system, an internal detection system and a wireless system. The air bag system further comprises a computer processing unit (CPU), at least one external air bag inflation device, and at least one internal air bag inflation device. The air bag system controls inflation size and absorption quantity of an air bag by means that the CPU receives information from the external detection system, the internal detection system, and the wireless system for a calculation based on the information inputted in the CPU and transmits control signal to the relevant parts of the air bag inflation device to enable the external air bag and the internal air bag to effectively inflate for protecting automobile body and object against damage and passengers against personal injury from a collision.

U.S. Pat. No. 6,416,093 to Schneider discloses an energy absorption, rotation and redirection system for use with a vehicle traveling astride a barrier, the vehicle including a front end with a bumper and first and second sides. The system includes a plurality of air bag actuating units mounted at specified locations along the front end and first and second sides of the vehicle. Preferably three air bag units are located at spaced intervals along the front bumper of the vehicle, with individual and additional air bags being located on the sides of the vehicle. An activator mechanism is associated with one or more of the actuating units for selectively instructing the inflation of an exterior air bag associated with the given bag actuating unit. The activator mechanism includes a reflective target strip applied along the barrier, as well as laser emitter/receptor units associated with each of the air bag actuating units. A computerized processor and memory chip is located in the vehicle and instructs the issuance of a lasing pattern from each of the emitter/receptor units. Upon at least one of the emitter/receptor units receiving a reflection from the target strip, indicative of a given orientation of the vehicle relative to the concrete wall barrier, the activator mechanism directs deployment of the external air bags and prior to the vehicle striking the barrier. The vehicle subsequently rotates and redirects about the barrier concurrent with the barrier absorbing a determined percentage of force associated with the contact.

U.S. Pat. No. 6,419,267 to Hashimoto, et al. discloses an air bag device which allows generation of suitable reaction force which corresponds to a physical constitution of a vehicle occupant abutting against an air bag body. In the air bag device, a region of an outer air bag body pressed by the vehicle occupant abuts an inner air bag body and closes vent holes formed in the inner air bag body. Therefore, a quantity of gas flowing from the inner air bag body into a space formed between the outer air bag body and the inner air bag body can be controlled. Accordingly, the quantity of gas flowing through the vent holes into the space and further escaping from the air bag body via vent holes formed in the outer air bag body can be adjusted in accordance with a physical constitution of the vehicle occupant abutting against the air bag body.

U.S. Pat. No. 6,439,605 to Ariyoshi teaches an air bag formed of a panel portion with a gas introducing port, a partition wall situated inside the panel portion for partitioning an inside of the panel portion into a first chamber located on a front side of an automobile and a second chamber located on a rear side of the automobile, a gas passage situated between the first chamber and the second chamber, and at least one vent hole formed in the panel portion at the second chamber. An air bag device includes, in addition to the air bag, a retainer for retaining the air bag, an inflator for expanding the air bag, and a lid for covering the retainer. In case a collision speed is small or the passenger is relatively small, the passenger can be received by the air bag with a soft touch. In case the collision speed is large or the passenger is large, the passenger can be securely received by the first and second chambers.

U.S. Pat. No. 6,450,556 to Jacobs discloses an external vehicle airbag system, a method of its use and a principal vehicle on which it is mounted. The system involves mounting an airbag at a bottom side of the principal vehicle at a position spaced substantially laterally inwardly from a lateral-side periphery of the principal vehicle. Also involved, is a sensor mounted on the principal vehicle at a position more laterally outwardly, in a direction toward the lateral-side periphery, than the airbag. The sensor senses a collision of the principal vehicle with a colliding vehicle and, in response thereto, inflates the airbag below the principal vehicle, along the bottom thereof toward the lateral-side periphery, to thereby absorb energy from the colliding vehicle and prevent under-riding. In one embodiment, the sensor is positioned approximately at the lateral-side periphery and it can be mounted on a rigid under-ride guard.

U.S. Pat. No. 6,467,563 to Ryan et al. teaches an air bag assembly including an inflator for discharging inflation gas and a gas receiving expansible air bag cushion of winged geometry disposed in fluid communication with the inflator such that upon release of inflation gas from the inflator the air bag cushion is deployed substantially over the windshield of an automobile as well as the pillars adjacent the windshield. View ports are present within the interior of the air bag cushion so as to maintain a degree of visibility for the vehicle operator after deployment has taken place. Mesh netting or a like material may extend across the internally formed view ports.

U.S. Pat. No. 6,474,679 to Miyasaka et al. teaches a vehicle air bag system with an air bag that inflates and unfolds to cover the entire front surface of a front pillar. When it is judged based on the detection operation of a collision detection device that there is a risk of colliding with a pedestrian, a hood pop-up device is actuated and the rear end part of the engine hood moves up, widening the gap between the rear end part and the front windshield. Simultaneously, the air bag module is actuated and the air bag expands out from the gap. The air bag inflates and unfolds so as to cover the entire front surface of the front pillar from the base to the upper end thereof.

U.S. Pat. No. 6,523,855 to Musiol, et al. teaches a partitioned air bag comprising an upper and a lower inflatable chamber. The lower chamber upon inflation is positioned to provide a cushioned boundary generally against the lower chest and abdomen of an occupant to be protected. The lower chamber first receives inflation gas from a source of inflation wherein the inflation gas is sequentially transferred to the upper chamber through one or more ports formed by a separator panel that separates the air bag into the upper and lower chambers. A single stage air bag inflator characterized as having a relatively low fill rate inflates the air bag.

U.S. Pat. No. 6,527,886 to Yamato, et al. teaches a gas-generant-molded-article for air bags which is prepared by molding a gas generant composition into a cylindrical form containing an opening hole, wherein the relationship between the linear burning velocity r (mm/second) of said gas generant composition under a pressure of 70 kgf/cm.sup.2 and a thickness W (mm) of said molded article falls within a range represented by 0.005.1 toreq.W/(2.multidot.r).1toreq.0.3, with the linear burning velocity preferably falling within a range of from 1 to 12.5 mm/second.

U.S. Pat. No. 6,543,803 to Harada, et al. teaches an air bag apparatus having a mounting base portion for preventing gas generated from an inflator from leaking from an insertion port of an air bag. The air bag apparatus has a gas generating inflator for expanding and developing an air bag assembled in an inner portion from an insertion port provided in a mounting base portion of the air bag. The inflator is positioned inside the air bag. An internal contact fabric for closing the insertion port of the air bag from the inner side is provided for preventing a gas leakage, and an external contact fabric is provided for reinforcing the bag mounting base portion.

U.S. Pat. No. 6,554,227 to Wolter teaches an apparatus with releasably fastened transport units for carrying a useful load, such as persons or freight.

U.S. Pat. No. 6,554,313 to Uchida teaches a safer air bag system which relieves shock to the head and face of an occupant when an air bag inflates and deploys. An air bag body consists of a primary air bag and a secondary air bag which is provided on the front surface of the primary air bag. When an inflator is actuated, the high-pressure gas is introduced into the primary air bag to inflate and deploy the primary air bag and then fed into the secondary air bag through gas introducing ports of the primary air bag so that the secondary air bag inflates and deploys more slowly than the primary air bag. The secondary air bag thus absorbs shock to the face of the occupant caused by the inflation and deployment of the primary air bag.

U.S. Pat. No. 6,612,256 to Martin discloses a combination boat and distressed boat flotation apparatus, a distressed boat flotation apparatus, and methods of installing and using a boat flotation apparatus. The combination preferably includes a boat including a boat hull and a plurality of flotation containers positioned to substantially surround the boat hull and positioned to be inflated with a gas responsive to the boat hull being in a distressed condition so that the boat is prevented from sinking by the inflated plurality of flotation containers. The apparatus of the combination also preferably includes a plurality of moisture sensors each positioned in the boat hull to sense the distressed condition and a distressed condition controller positioned in communication with the plurality of moisture sensors and the plurality of flotation containers to control the inflation of the plurality of flotation containers responsive to at least one of the plurality of moisture sensors sensing the distressed condition.

U.S. Pat. No. 6,648,371 to Vendely, et al. discloses an air bag assembly having an inflatable cushion selectively deployable to a controlled geometry with a controlled venting character. The venting characteristics are adjusted by selective displacement of vent blocking elements based upon measured occupant and/or crash severity characteristics such that an air bag cushion of desired volume and venting capacity is available to protect a range of occupants under different conditions during impact events of various levels of severity.

U.S. Pat. No. 6,669,231 to Ryan discloses an air bag module for inflating an air bag cushion at dual rates in response to rapid deceleration of a motor vehicle. The air bag module includes an air bag housing for receiving an inflator. The air bag cushion is secured to a peripheral flange of the housing in a folded position. Upon actuation of the inflator, heated gas passes selectively from the inflator through a plurality of openings in the housing. A controller generates an ignition signal to the inflator in response to velocity responsive sensors. In response to the ignition signals, the inflator releases an appropriate predetermined volume of gas into the air bag cushion. The level of deployment or inflation of the air bag cushion is dependent on the actuation of a slide slidably arranged to selectively block the openings of the air bag housing to restrict gas flow to the air bag cushion. The housing further includes venting apertures to permit gas flow from the housing and thereby redirect the gas away from the air bag cushion.

U.S. Pat. No. 6,682,017 to Giannakopoulos discloses an aircraft with a detachable cabin that serves to rescue its passengers as a result of the aircraft's sudden fall either due to its malfunction or fire. The cabin escapes either smoothly or by means of fast ejection and descends slowly to the Earth with the aid of a parachute; during a crash on the ground or in the sea external airbags with which it is equipped and which are located in its lower part are inflated thus absorbing the loads that are developed during the crash. In addition a conventional aircraft of the type being already in use is also described and in which the parachute equipment has already been applied; however, the proposed equipment of the airbag boxes is adapted to it for the absorption of the energy produced due to its crash on Earth in case of its sudden fall.

U.S. Pat. No. 6,749,218 to Breed discloses an externally deployed airbag system for a vehicle including one or more inflatable airbags deployable outside of the vehicle. Also provided is an anticipatory sensor system for assessing the probable severity of an impact involving the vehicle based on data obtained prior to the impact and initiating inflation of the airbag(s) in the event an impact above a threshold severity is assessed. An inflator is coupled to the anticipatory sensor system and the airbag for inflating the airbag when initiated by the anticipatory sensor system. The airbag may be housed in a module mounted along a side of the vehicle, in a side door of the vehicle, at a front of the vehicle or at a rear of the vehicle. Also, the externally deployed airbag can be deployed to cushion a pedestrian's impact against the vehicle.

U.S. Pat. No. 6,758,442 to Bailey teaches a guided parafoil system for delivering lightweight payloads provides an accurate, small and low-cost delivery system for small payloads such as chemical sensor packages. The delivery system is adapted to fit along with the payload within a standardized canister. The delivery system includes a parafoil and a guidance control system that includes a global positioning system (GPS) receiver and an electronic compass to detect a deviation and bearing from a desired target. The parafoil is guided by a single motor that turns the parafoil in a horizontal direction perpendicular to the current direction of travel in response to deviations detected from a desired course. The desired course is initially linear until the system reaches a predetermined horizontal radius from the target and then the course becomes a circular path around and above the target.

U.S. Pat. No. 6,761,334 to Nutu, et al. teaches an aircraft having a fuselage with a cockpit and a tail, and jet or propeller propulsion. The improved aircraft has a fuselage with one or more modules located between the cockpit and the tail. The modules include passenger seating, means to seal the modules, and means to detach the modules from the fuselage. One or more parachutes connect to the modules for use during an in-flight emergency, and the modules have a means to store the parachutes. Also, modules allow an airline to load passengers by groups onto an aircraft and to change the configuration of aircraft readily.

U.S. Pat. No. 6,772,057 to Breed, et al. teaches a vehicular monitoring arrangement for monitoring an environment of the vehicle including at least one active pixel camera for obtaining images of the environment of the vehicle and a processor coupled to the active pixel camera(s) for determining at least one characteristic of an object in the environment based on the images obtained by the active pixel camera(s). The active pixel camera can be arranged in a headliner, roof or ceiling of the vehicle to obtain images of an interior environment of the vehicle, in an A-pillar or B-pillar of the vehicle to obtain images of an interior environment of the vehicle, or in a roof, ceiling, B-pillar or C-pillar of the vehicle to obtain images of an interior environment of the vehicle behind a front seat of the vehicle. The determined characteristic can be used to enable optimal control of a reactive component, system or subsystem coupled to the processor. When the reactive component is an airbag assembly including at least one airbag, the processor can be designed to control at least one deployment parameter of the airbag(s).

U.S. Pat. No. 6,814,019 to Mears, et al. discloses a flotation device for maintaining a watercraft in a floating condition. The flotation device comprising a cover releasably secured to the watercraft. At least one directing bladder is positioned between the cover and the watercraft. At least one inflatable flotation bladder is positioned between the cover and the watercraft wherein upon inflation of the directing bladder, the directing bladder releases at least a portion of the cover from the watercraft.

U.S. Pat. No. 6,817,579 to van der Velden, et al. teaches an autonomous passenger module releasably carried on a super-sonic aircraft, such as a military fighter jet, for carrying plural passengers on supersonic and near space flights. The passenger module is equipped with passenger service and life support systems to provide oxygen and the like, a parachute system, and a landing airbag or flotation aid system. The module remains mounted on the aircraft throughout a normal flight. In an emergency situation, the module separates from the aircraft by means of releasable connector elements and descends using parachutes. The module provides high passenger capacity at a low cost in a simple manner for commercial supersonic flights using an existing supersonic aircraft as a carrier platform.

Therefore, it is an object of the present invention to provide an improved pre-impact inflation air bag system for a vehicle which is a significant improvement over the prior art.

Another object of this invention is to provide an improved pre-impact inflation air bag system for a vehicle which is adaptable to a land vehicle, a water vehicle or an air vehicle.

Another object of this invention is to provide an improved pre-impact inflation air bag system for a vehicle including a plurality of inflators for simultaneously inflating a plurality of nested inflatable air bags.

Another object of this invention is to provide an improved pre-impact inflation air bag system for a vehicle including a plurality of pressure relief members connected to a plurality of nested inflatable air bags for sequentially deflating the plurality of nested inflatable air bags upon sequential impact of the plurality of nested inflatable air bags with an object.

Another object of this invention is to provide an improved pre-impact inflation air bag system for a vehicle wherein the deceleration force of the vehicle is maintained less than eighteen time the force of gravity (18 g).

Another object of this invention is to provide an improved pre-impact inflation air bag system for a vehicle having an immersion sensor for simultaneously inflating a plurality of nested inflatable air bags to provide flotation for the vehicle.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly, other objects may be had by referring to the summary of the invention and the detailed description setting forth the preferred embodiment in addition to the scope of the invention defined by the claims taken in conjunction with the accompanying drawings.

SUMMARY OF THE INVENTION

A specific embodiment of the present invention is shown in the attached drawings. For the purpose of summarizing the invention, the invention relates to an improved method and apparatus comprising a pre-impact inflation air bag system for a vehicle having a preselected decreasing distance between the vehicle and an object. The system comprises a plurality of nested inflatable air bags. An enclosure is located on the vehicle for containing the plurality of nested inflatable air bags. A plurality of inflators are provided for inflating the plurality of nested inflatable air bags, respectively. A collision sensor produces a collision sensor output upon detecting the object with the preselected decreasing distance between the vehicle and the object. A controller receives the collision sensor output for simultaneously inflating each of the plurality of nested inflatable air bags between vehicle and an object. A plurality of pressure relief members are connected to the plurality of nested inflatable air bags for sequentially deflating the plurality of nested inflatable air bags upon sequential impact of the plurality of nested inflatable air bags with the object.

In a more specific embodiment of the invention, the plurality of nested inflatable air bags comprises a second and a third inflatable airbag being located within a first inflatable airbag and with the third inflatable airbag being located within the second inflatable airbag. The enclosure comprises a hollow chamber for containing the plurality of nested inflatable air bags. The enclosure opens for permitting inflation and expansion of the plurality of nested inflatable air bags.

In another embodiment of the invention, the collision sensor for detecting the object with the preselected decreasing distance between the vehicle and the object comprises a radar sensor system. The collision sensor for detecting the object with the preselected decreasing distance between the vehicle and the object is selected from the group consisting of a radar sensor, a laser sensor, an ultrasonic sensor, a road proximity sensor, or a tilt sensor.

In one embodiment of the invention, an immersion sensor is provided for producing an immersion sensor output upon detecting the immersion of a portion of the vehicle within water. The controller receives the immersion sensor output for simultaneously inflating each of the plurality of nested inflatable air bags to provide flotation for the vehicle.

In one embodiment of the invention, the plurality of pressure relief members comprise a plurality of rupture devices cooperating with the plurality of nested inflatable air bags, respectively. Each of the rupture devices ruptures at predetermined differential pressure for deflating the plurality of nested inflatable air bags upon impact of each of the plurality of nested inflatable air bags with the object, respectively. The outer inflatable air bag of the plurality of nested inflatable air bags ruptures prior to an inner inflatable air bag of the plurality of nested inflatable air bags, providing a sequential deflation of the plurality of nested inflatable air bags upon sequential impact of the plurality of nested inflatable air bags with the object.

In another embodiment of the invention, a plurality of nested inflatable air bags comprising a first inflatable airbag, a second inflatable airbag and a third inflatable airbag. The plurality of inflatable airbags are disposed in a nested relationship with the second and third inflatable airbags being located within the first inflatable airbag and with the third inflatable airbag being located within the second inflatable airbag. An enclosure is located on the vehicle for containing the plurality of nested inflatable air bags. The plurality of inflators comprise a first through third inflators for inflating the first through third inflatable airbags, respectively. A sensor is provided for producing a sensor output upon detecting the object with the preselected decreasing distance between the vehicle and the object. A controller receives the sensor output for enabling the first through third inflator to individually and simultaneously inflate the first through third inflatable airbags, respectively, between vehicle and an object. A plurality of pressure relief members deflates the plurality of nested inflatable air bags upon impact of each of the plurality of nested inflatable air bags with the object, respectively. The first inflatable airbag deflates prior to the second inflatable airbag and the second inflatable airbag deflates prior to the third inflatable airbag. Preferably, each of the plurality of pressure relief members is actuated as the deceleration force of the vehicle approaches eighteen times the force of gravity (18 g).

The invention is also incorporated into the method of deploying a plurality of impact inflation air bags for reducing an impact to a vehicle upon an imminent collision with an object. The method comprises the steps of simultaneously inflating a plurality of nested inflatable air bags between the vehicle and the object for decreasing a velocity of the vehicle. The plurality of nested inflatable air bags are sequentially deflated starting with a deflation of an outer most inflatable air bag to an inner most inflatable air bag of the plurality of nested inflatable air bags to limit the maximum deceleration of the vehicle to be under eighteen-times the force of gravity (18 g) during the sequentially deflating the plurality of nested inflatable air bags.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which:

FIG. 3 is an enlarged view along line 3—3 in FIG. 2;

FIG. 4 is a magnified view of a portion of FIG. 3;

Similar reference characters refer to similar parts throughout the several Figures of the drawings.

DETAILED DISCUSSION

Figure 1:
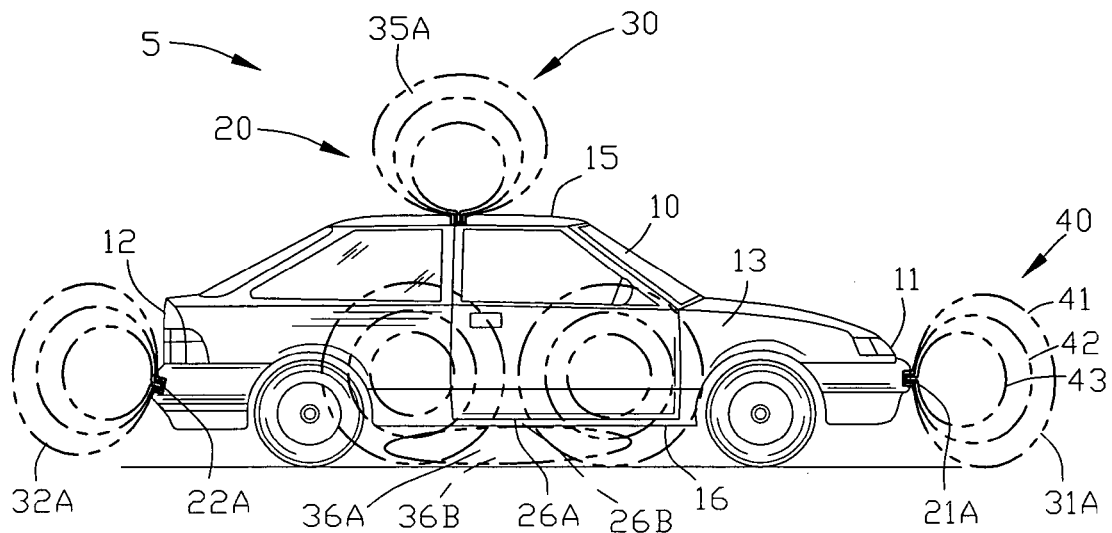
FIG. 1 is a side view of a land vehicle incorporating the pre-impact inflation air bag system of the present invention illustrating the deployment of a plurality of nested inflatable air bags.
Figure 2:
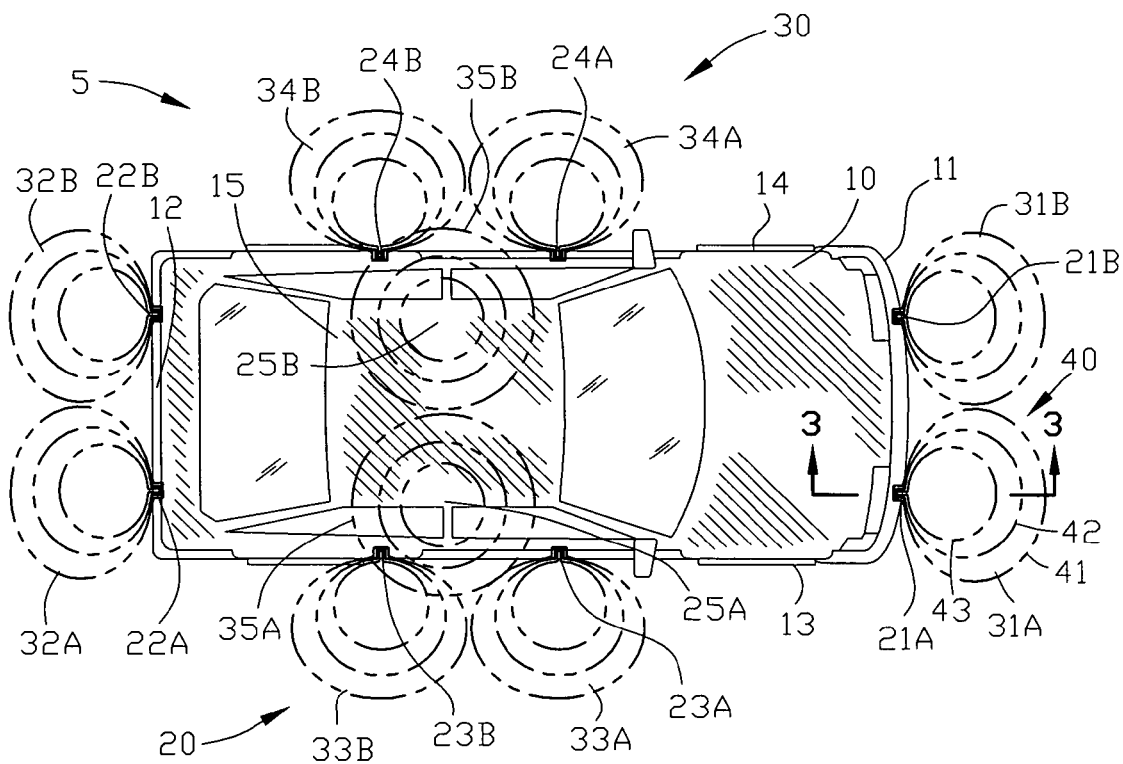
FIG. 2 is a top view of FIG. 1.

FIGS. 1 and 2 are side and top views of the pre-impact inflation air bag system 5 of the present invention installed on a vehicle 10. In this example of the invention, the vehicle 10 is shown at a land vehicle 10 in the form of a conventional automobile. However, it should be understood that the vehicle 10 as contemplated herein is intended to embrace all types of land vehicles, marine crafts as well as air vehicles or aircrafts.

The vehicle 10 defines a front and a rear 11 and 12, sides 13 and 14 and top and bottom 15 and 16. The vehicle 10 includes an enclosure 20 for containing a plurality of nested inflatable air bags 30. Preferably, each of the enclosures 20 includes an enclosure cover 28 for enclosing the plurality of nested inflatable air bags 30 within the enclosure 20. The enclosure covers 28 are removably secured to the enclosure 20 for enabling the plurality of nested inflatable air bags 30 to be inflated and to extend from the enclosure 20.

In this example, the front 11 of the vehicle 10 includes enclosures 21A and 21B for containing a plurality of nested inflatable air bags 31A and 31B. The rear 12 of the vehicle 10 includes enclosures 22A and 22B for containing a plurality of nested inflatable air bags 32A and 32B. The sides 13 and 14 of the vehicle 10 include enclosures 23A and 23B and 24A and 24B for containing a plurality of nested inflatable air bags 33A and 33B and 34A and 34B. The top 15 of the vehicle 10 includes enclosures 25A and 25B for containing a plurality of nested inflatable air bags 35A and 35B. The bottom 16 of the vehicle 10 includes enclosures 26A and 26A for containing a plurality of nested inflatable air bags 36A and 36B.

FIG. 3 is an enlarged view along line 3—3 in FIG. 2 illustrating the plurality of nested inflatable air bags 30 deployed from the enclosure 20. The plurality of nested inflatable air bags 30 includes first, second and third inflatable air bags 41–43. The second inflatable air bag 42 and the third inflatable air bag 43 are located within a first inflatable air bag 41. The third inflatable air bag 43 is located within the second inflatable air bag 42. Although three inflatable airbags 41–43 have been shown in this example, it should be understood that the present invention may incorporate any multiple number of nested airbags 30.

FIG. 4 is a magnified view of a portion of FIG. 3 illustrating a plurality of inflators 50 for inflating the plurality of nested inflatable air bags 30, respectively. Preferably, the plurality of inflators 50 on a conventional design and should be well known by those skilled in the art.

The plurality of inflators 51–53 are respectively connected to the plurality of inflatable airbags 31–33. The first, second and third inflators 51–53 are directly connected for inflating the first, second and third inflatable air bags 41–43. The direct connection of the first, second and third insulators 51–53 to the first, second and third inflatable airbags 41–43 enables the simultaneous inflation of the first, second and third inflatable airbags 41–43 upon ignition of the plurality of inflators 51–53.

Figure 5:
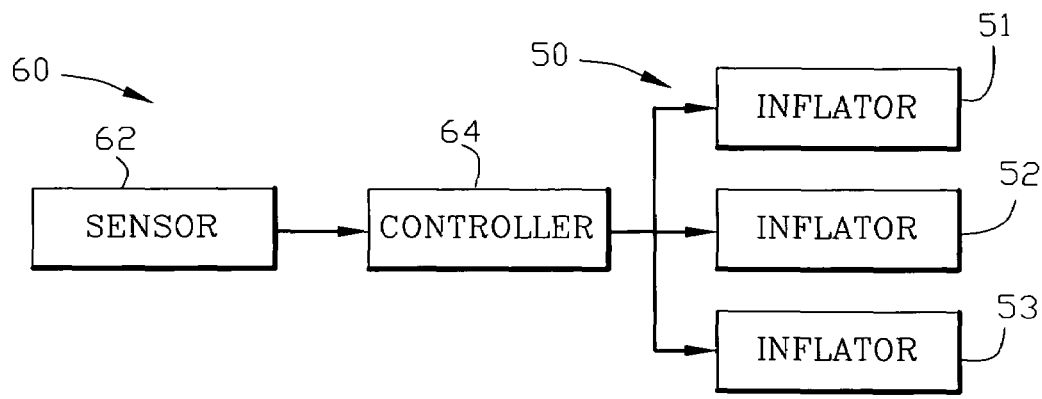
FIG. 5 is a block diagram illustrating the interconnection of a sensor, a controller and an inflator of the pre-impact inflation air bag system.

FIG. 5 is a block diagram illustrating a circuit 60 for igniting the plurality of inflators 51–53. The circuit 60 comprises a sensor 62 connected to a controller 64. Upon the sensor 62 sensing preselected decreasing distance between the vehicle 10 and an object 68 shown in FIG. 11, the controller 64 individually and simultaneously ignites the plurality of inflators 51–53. Preferably, the sensor 62 and the controller 64 may be of conventional design and configuration.

Figure 6:
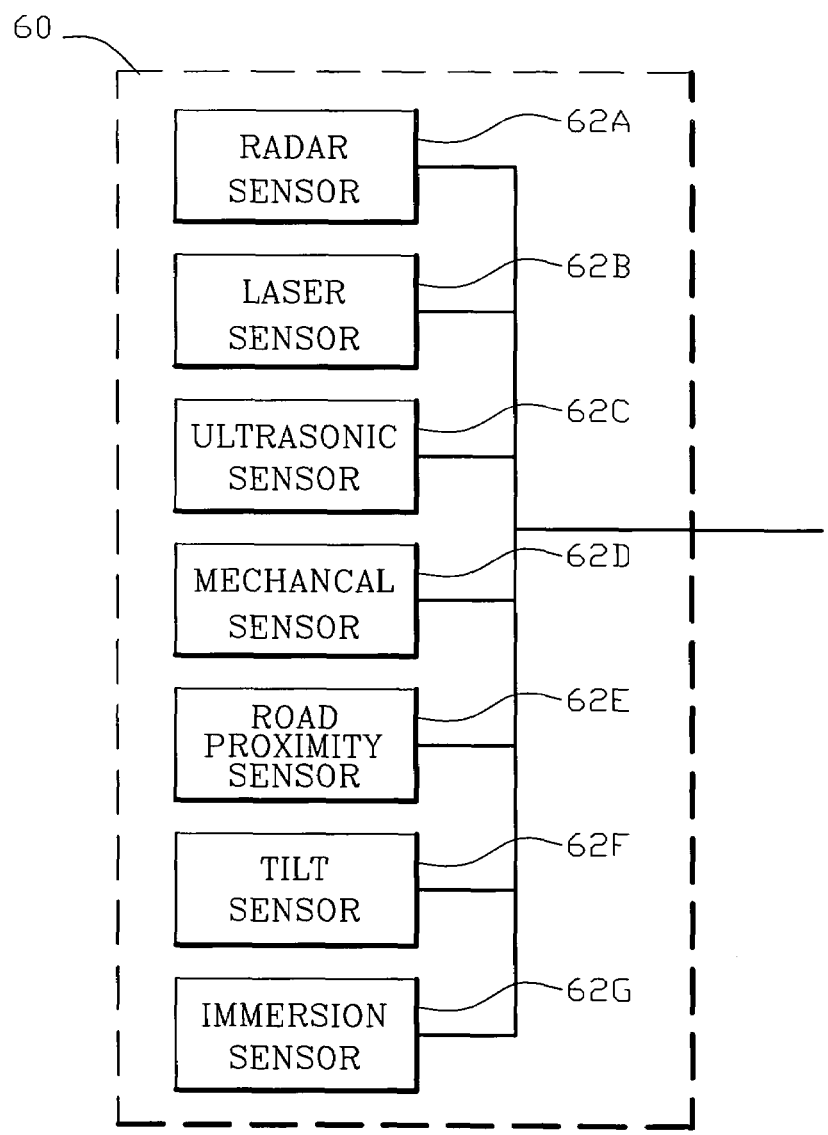
FIG. 6 is a block diagram illustrating various types of sensors suitable for use with the pre-impact inflation air bag system.

FIG. 6 is a block diagram illustrating a series of sensors 62A–62G suitable for use with the pre-impact inflation air bag system 5 of the present invention. The sensor 62 is shown as a radar sensor 62A for producing a sensor output upon detecting the object 68 with the preselected decreasing distance between the vehicle 10 and the object 68. The sensor 62 is shown as a laser sensor 62B for producing a sensor output upon detecting the object 68 with the preselected decreasing distance between the vehicle 10 and the object 68. The sensor 62 is shown as an ultrasonic sensor 62C for producing a sensor output upon detecting the object 68 with the preselected decreasing distance between the vehicle 10 and the object 68. The sensor 62 is shown as a mechanical sensor 62D for producing a sensor output upon detecting the object 68 with the preselected decreasing distance between the vehicle 10 and the object 68. The sensor 62 is shown as a road proximity sensor 62E for producing a sensor output upon detecting a preselected increasing distance between the vehicle 10 and a road surface 69. The sensor 62 is shown as a tilt sensor for producing a sensor output 62F upon detecting a preselected increasing distance between the vehicle 10 and the road surface 69. The sensor 62 is shown as an immersion sensor 62G for producing a sensor output upon detecting the immersion of a portion of the vehicle 10 within water. It should be understood by those skilled in the art that the pre-impact inflation air bag system 5 of the present invention may include one or more of the sensors 62A–62G set forth in FIG. 6.

The controller 64 receiving an output from the sensor 62 for simultaneously inflating each of the plurality of nested inflatable air bags 41–43 between vehicle 10 and an object. Each of the plurality of nested inflatable air bags 41–43 are individually and simultaneously inflated by each of the plurality of inflators 51–53, respectively upon receipt of an output from the controller 64.

Figure 7:
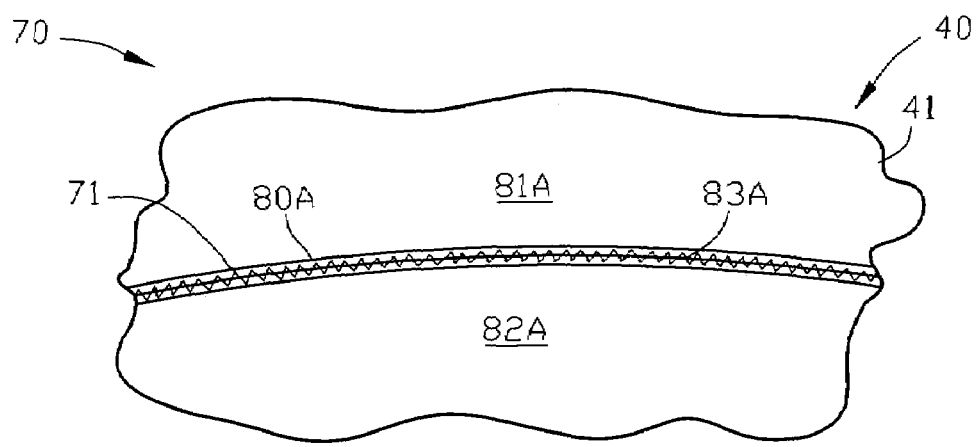
FIG. 7 is a magnified sectional view illustrating a first embodiment of pressure relief member for the inflatable air bag shown as a frangible seam.

FIG. 7 is a magnified sectional view illustrating a first embodiment of pressure relief member 70 for the plurality of nested inflatable air bags 40. In this example, a first pressure relief member 71 is shown located on the first inflatable air bag 41. The pressure relief member 71 is shown as a frangible seam 80A. The frangible seam 80A comprises a first sheet material 81A secured to a second sheet material 82A secured by a connector 83A. The connector 83A may comprise an adhesive, a stitch, a frangible patch or any other suitable means for creating a pressure relief member 71. The first sheet material 81A is secured to the second sheet material 82A to fracture when a predetermined pressure is applied to the first inflatable air bag 41.

Figure 8:
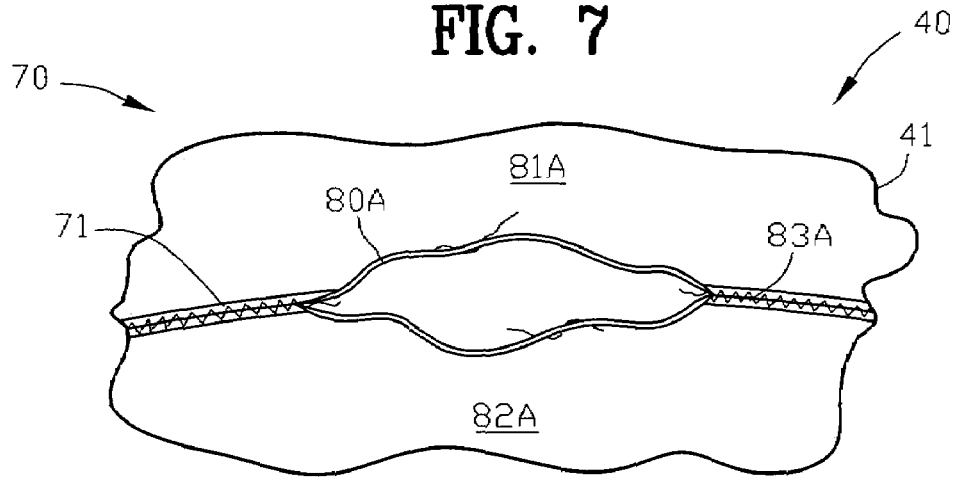
FIG. 8 is a view similar to FIG. 7 illustrating the rupturing of the frangible seam.

FIG. 8 is a view similar to FIG. 7 illustrating the rupturing of the frangible seam 80A. When a predetermined pressure is applied to the first inflatable air bag 41, the frangible seam 80A ruptures for enabling a controlled deflation of the first inflatable air bag 41.

Figure 9:
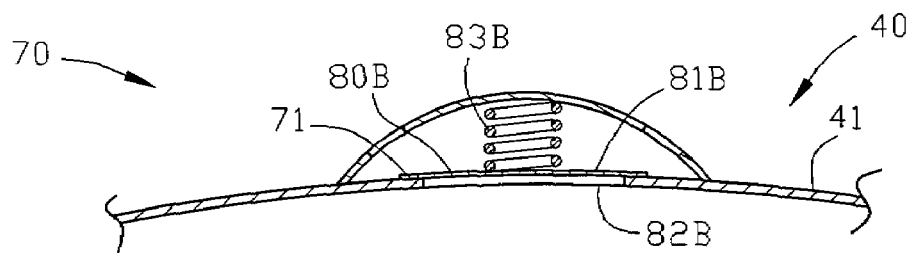
FIG. 9 is a magnified sectional view illustrating a second embodiment of pressure relief member for the inflatable air bag shown as a pressure relief valve.

FIG. 9 is a magnified sectional view illustrating a second embodiment of pressure relief member 71 for the first inflatable air bag 41 shown as a pressure relief valve 80B. The pressure relief valve 80B comprises a valve member 81B for closing a deflation aperture 82B. A spring 83B urges the valve member 81B in a closed position for closing the deflation aperture 82B.

Figure 10:
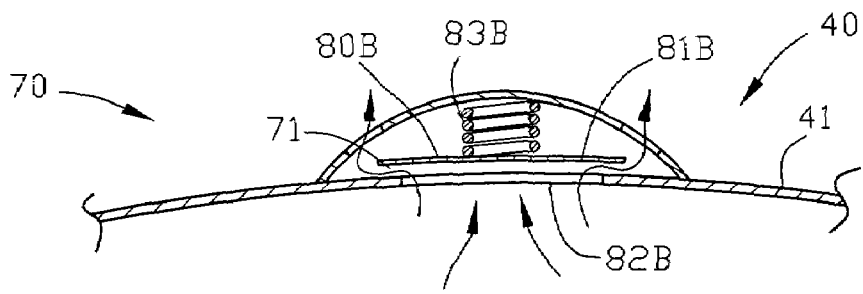
FIG. 10 is a view similar to FIG. 9 illustrating the opening of the pressure relief valve.

FIG. 10 is a view similar to FIG. 8 illustrating the opening of the pressure relief valve 80B. When a predetermined pressure is applied to the first inflatable air bag 41, the internal pressure within the first inflatable air bag 41 opens the valve member 81B against the urging of spring 83B to open the deflation aperture 82B.

A plurality of pressure relief members 70 are connected to the plurality of nested inflatable air bags 40 for sequentially deflating the plurality of nested inflatable air bags 40 upon sequential impact of the plurality of nested inflatable air bags 40 with the object 68. Each of the pressure relief members 70 opening or rupturing at predetermined differential pressures for deflating the plurality of nested inflatable air bags 40 upon impact of each of the plurality of nested inflatable air bags 40 with the object 68, respectively.

The plurality of pressure relief members 70 comprises each of the plurality of nested inflatable air bags 40 having a specifically designed burst pressure for rupturing the plurality of nested inflatable air bags 40 at a predetermined differential pressure, respectively. Preferably, each of the pressure relief members 70 opening or rupturing at differential pressure less than the pressure which would exceed 18 times the force of gravity (18 g) for deflating the plurality of nested inflatable air bags 40 upon impact of each of the plurality of nested inflatable air bags 40 with the object 68, respectively. Preferably, the inner most nested inflatable air bag 40 does not incorporate the pressure relief members 70.

Figure 11:
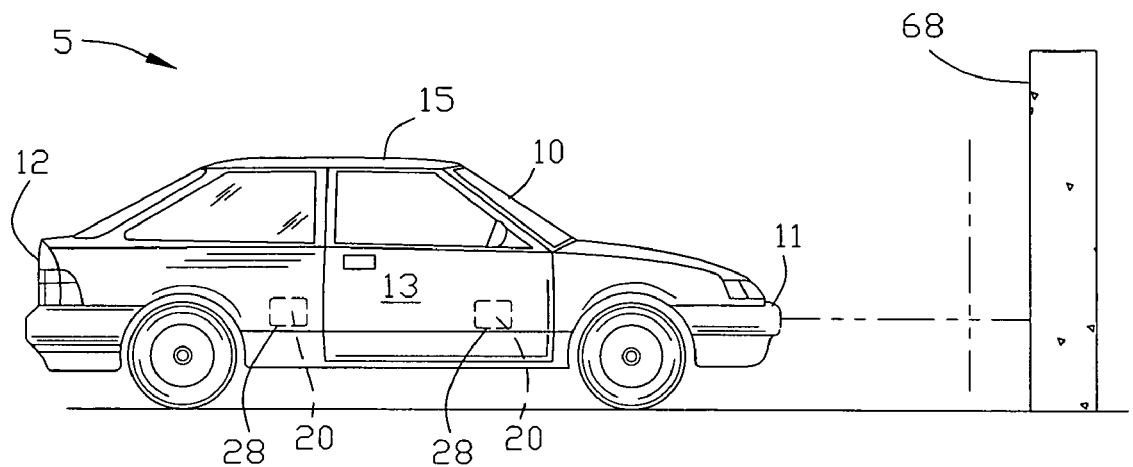
FIG. 11 illustrates the vehicle of FIG. 1 approaching an object at a velocity sufficient to actuate the pre-impact inflation air bag system.

FIG. 11 illustrates the vehicle 10 of FIG. 1 approaching an object 68 at a velocity sufficient to actuate the pre-impact inflation air bag system 5. The sensor 62 produces a sensor output upon detecting the object 68 with the preselected decreasing distance between the vehicle 10 and the object 68. The controller 64 receives the sensor output from the sensor 62 for enabling the first, second and third inflators 51–52 to individually and simultaneously inflate the first, second and third inflatable air bags 41–43.

Figure 12:
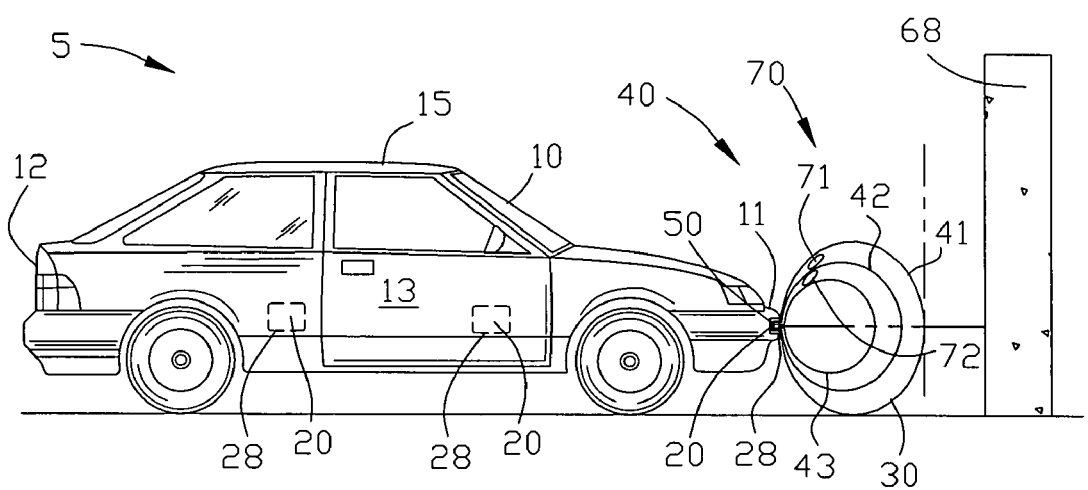
FIG. 12 is a view similar to FIG. 11 illustrating the simultaneous deployment of the plurality of nested inflatable air bags.

FIG. 12 is a view similar to FIG. 11 illustrating the simultaneous inflation of the plurality of nested inflatable air bags 41–43. The individual and simultaneous inflation of the first, second and third inflatable air bags 41–43 by the first, second and third inflators 51–52 results in an extremely fast inflation of the inflatable air bags 41–43. The extremely fast inflation of the inflatable air bags 41–43 insures that the inflatable air bags 41–43 are totally inflated prior to the contact with the object 68.

Figure 13:
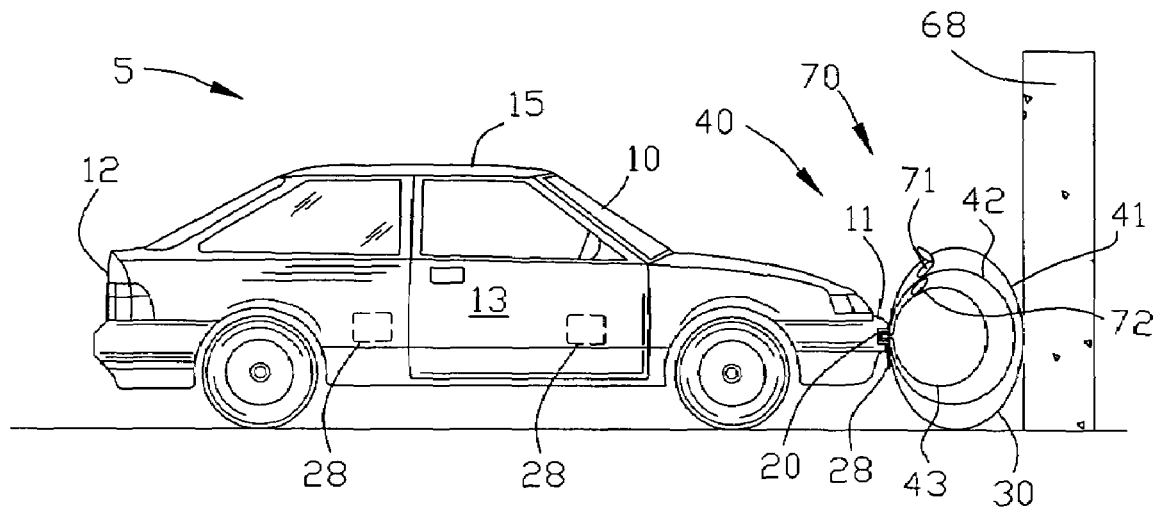
FIG. 13 is a view similar to FIG. 12 illustrating the rupturing of an outer inflatable air bag after contact with the object.

FIG. 13 is a view similar to FIG. 12 illustrating the opening or rupturing of the first inflatable air bag 41 after contact with the object 68. The first pressure relief members 71 opens or ruptures at differential pressure limiting the deceleration of vehicle 10 to less than 18 times the force of gravity (18 g) for providing a controlled deflating the first inflatable air bag 41.

Figure 14:
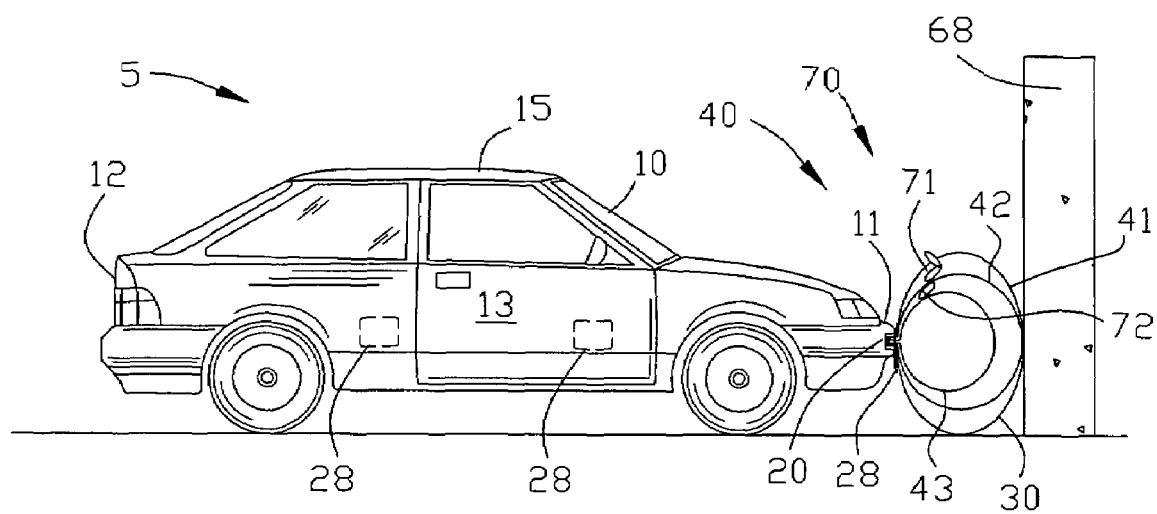
FIG. 14 is a view similar to FIG. 13 illustrating the deflation of the outer inflatable air bag and the contact of an intermediate inflatable airbag with the object.

FIG. 14 is a view similar to FIG. 13 illustrating the continued deflation of the first inflatable air bag 41 and the contact of the second inflatable airbag 42 with the object 68. The continued deflation of the first inflatable air bag 41 provides a controlled deceleration of the vehicle 10 prior to contact with the object 68.

Figure 15:
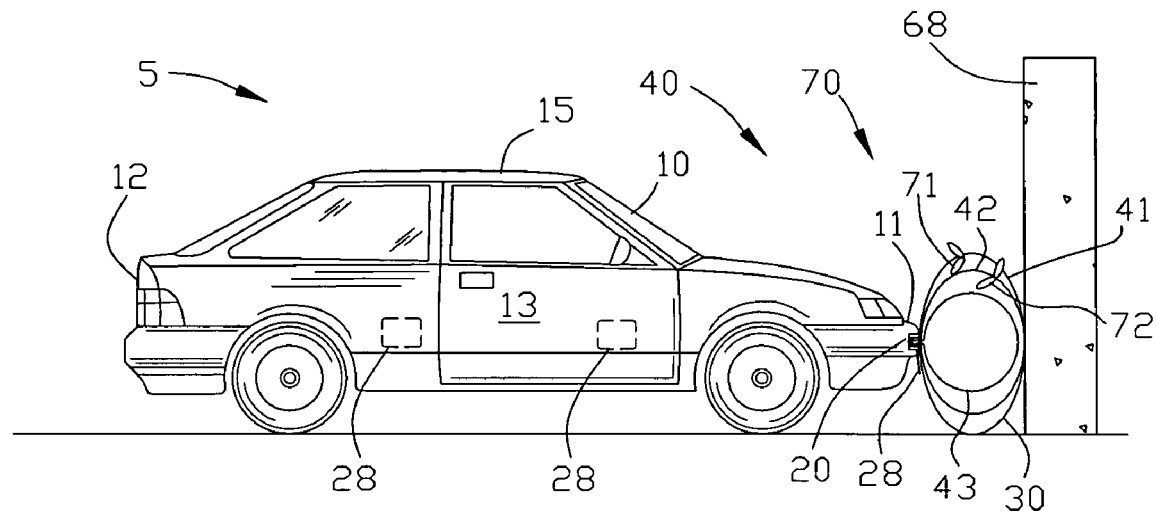
FIG. 15 is a view similar to FIG. 14 illustrating the rupturing of the intermediate inflatable air bag after contact with the object.

FIG. 15 is a view similar to FIG. 14 illustrating the opening or rupturing of the second inflatable air bag 42 after contact with the object 68. The pressure relief member 72 opens or ruptures at differential pressure limiting the deceleration of vehicle 10 to less than 18 times the force of gravity (18 g) for providing a controlled deflating the second inflatable air bag 42. The first inflatable air bag 41 continues to provide a controlled deflation of the vehicle 10.

Figure 16:
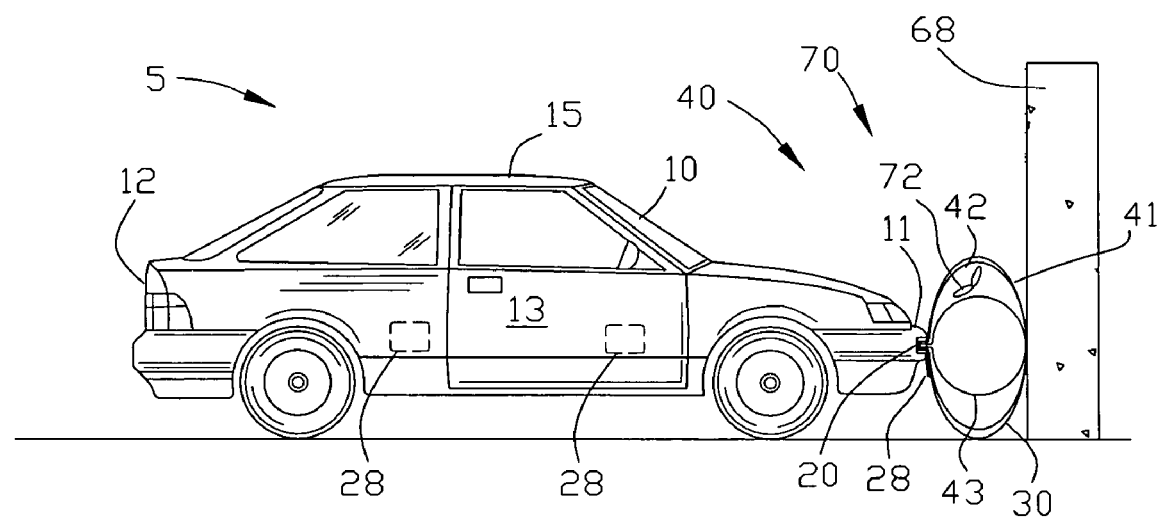
FIG. 16 is a view similar to FIG. 15 illustrating the deflation of the intermediate inflatable air bag and the contact of an inner inflatable airbag with the object.

FIG. 16 is a view similar to FIG. 15 illustrating the continued deflation of the second inflatable air bag 42 and the contact of the third inflatable airbag 43 with the object 68. The continued deflation of the second inflatable air bag 42 provides a controlled deceleration of the vehicle 10 prior to contact with the object 68.

Figure 17:
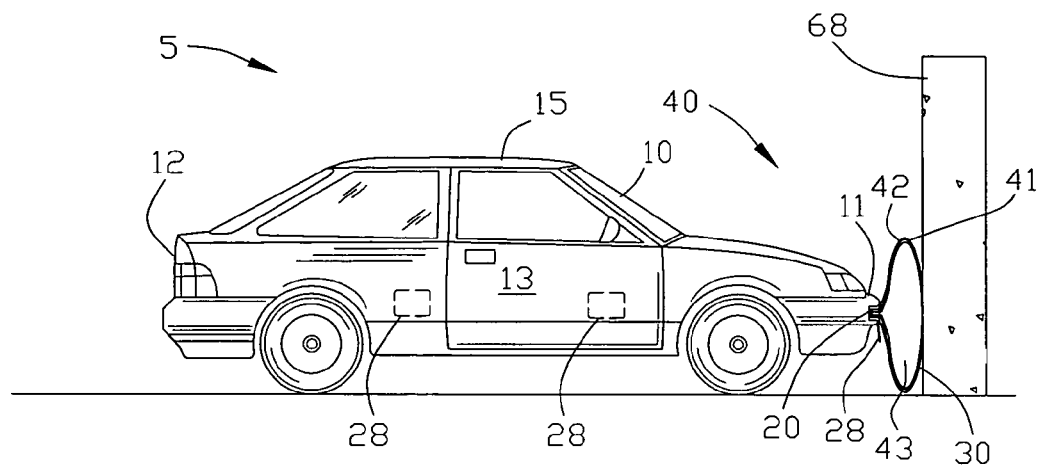
FIG. 17 is a view similar to FIG. 16 illustrating the compression of the inner inflatable airbag by the object.

FIG. 17 is a view similar to FIG. 16 illustrating the compression of the third inflatable airbag 43 by the object 68. The compression of the third inflatable airbag 43 by the object 68 provides a controlled deceleration of the vehicle 10 prior to contact with the object 68. In this example, the third inflatable airbag 43 does not incorporate the pressure relief members 70. The third inflatable airbag 43 provides a controlled deceleration of the vehicle 10 by the compress on the gases within the third inflatable airbag 43 and/or the deformation of the third inflatable airbag 43.

The use of a plurality of nested inflatable air bags 41–43 incorporating a plurality of pressure relief members 71 and 72 providing a sequential deflation of the plurality of nested inflatable air bags 41 and 42 upon sequential impact of the plurality of nested inflatable air bags 41–43 with the object 68. Preferably, the sequential deflating of the plurality of nested inflatable air bags 41 and 42 limit the maximum deceleration of the vehicle 10 to be under eighteen-times the force of gravity (18 g).

Figure 18:
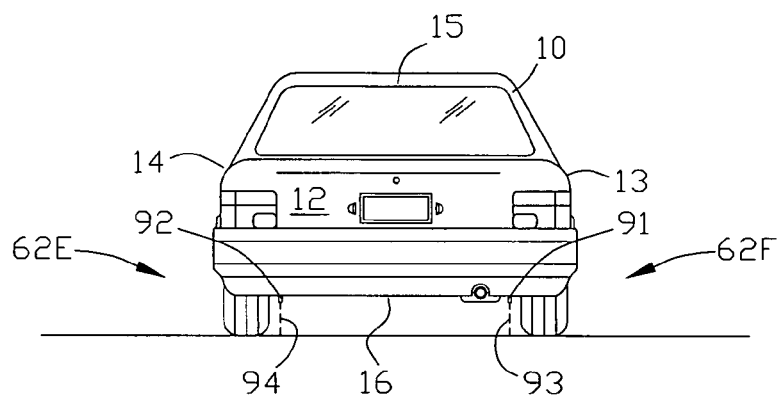
FIG. 18 is a rear view of the land vehicle of FIG. 1.

FIG. 18 is a rear view of the land vehicle 10 of FIG. 1 and a normal operating position relative to a road surface 69. The land vehicle 10 is provided with a road proximity sensor 62E and a tilt sensor 62F. In this example, the road proximity sensor 62E and the tilt sensor 62F comprises plural lasers 91 and 92 generating laser beams 93 and 94 for sensing the distance between the undercarriage of the vehicle 10 and the road surface 69 adjacent the sides 13 and 14 of the vehicle 10.

Figure 19:
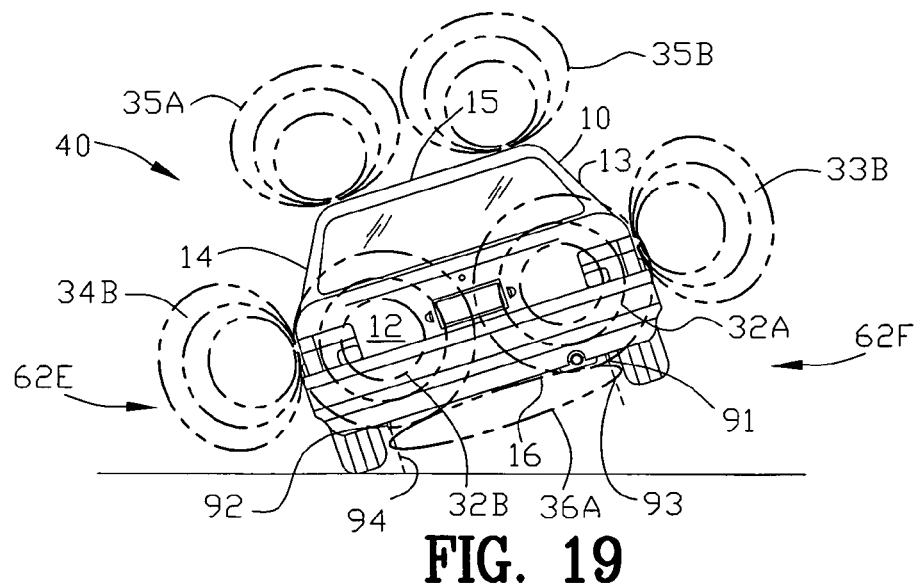
FIG. 19 is a rear view of the land vehicle of FIG. 1 illustrating the deployment of the plurality of nested inflatable air bags upon the tilting of the land vehicle.

FIG. 19 is a rear view of the land vehicle of FIG. 1 illustrating a major increase of the distance between the undercarriage of the vehicle 10 and the road surface 69. The road proximity sensor 62E senses a major increase of the distance between the undercarriage of the vehicle 10 and the road surface 69. When the road proximity sensor 62E senses a major increase of the distance between the undercarriage of the vehicle 10 and the road surface 69, the controller 64 simultaneously inflates each of the plurality of nested inflatable air bags 40 to provide protection for the land vehicle 10 in the event of a roll of the land vehicle 10. The road proximity sensor 62E is active only when the vehicle 10 is in motion to prevent accidental deployment of the plurality of inflatable air bags 40 during the servicing of the vehicle 10.

FIG. 19 illustrates the tilting of the land vehicle 10 beyond a predetermined angle relative to the road surface 69. The tilt sensor 62F senses the tilting of the vehicle 10 relative to the road surface 69. When the tilt sensor 62F senses the tilting of the vehicle 10 relative to the road surface 69, the controller 64 simultaneously inflates each of the plurality of nested inflatable air bags 40 to provide protection for the land vehicle 10 in the event of a flip roll of the land vehicle 10.

Figure 20:
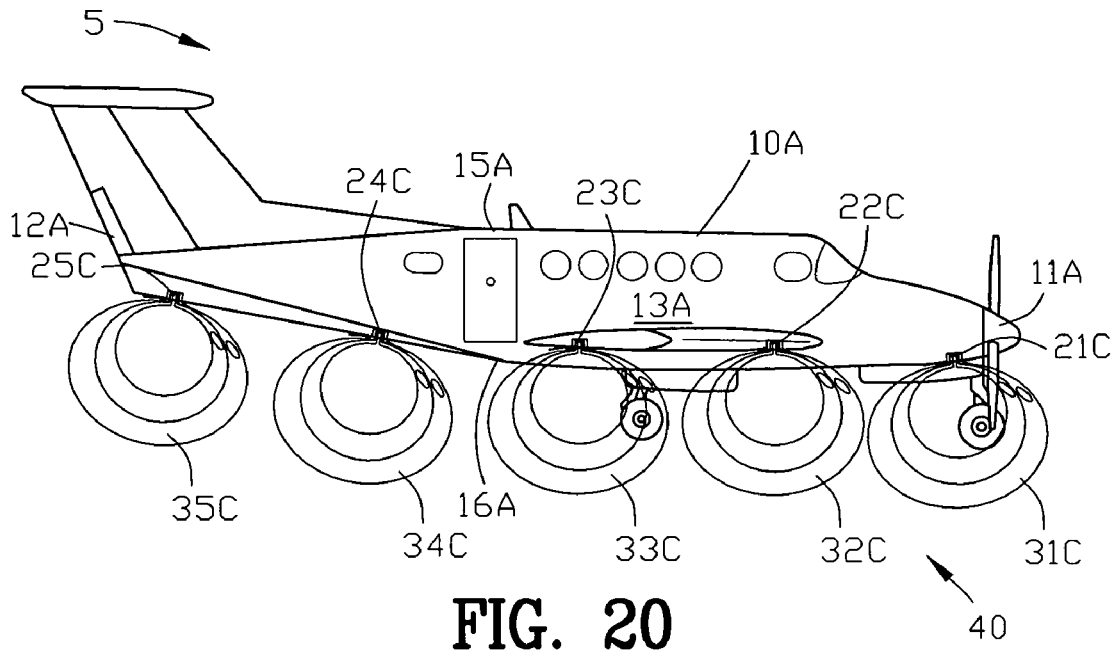
FIG. 20 is a side view of an aircraft incorporating the pre-impact inflation air bag system of the present invention.

FIG. 20 is a side view of an aircraft 10A incorporating the pre-impact inflation air bag system 5 of the present invention. In this example, pre-impact inflation air bag system 5 incorporates an immersion sensor 62G. The immersion sensor 62G provide an immersion sensor output upon detecting the immersion of a portion of the aircraft 10A within water. The controller 64 receives the immersion sensor output for simultaneously inflating each of the plurality of nested inflatable air bags 31C–35C to provide flotation for the aircraft 10A. In the alternative, the plurality of nested inflatable air bags 31C–35C may be inflated by other sensors 60 as set forth previously prior to impact by the aircraft 10A.

Figure 21:
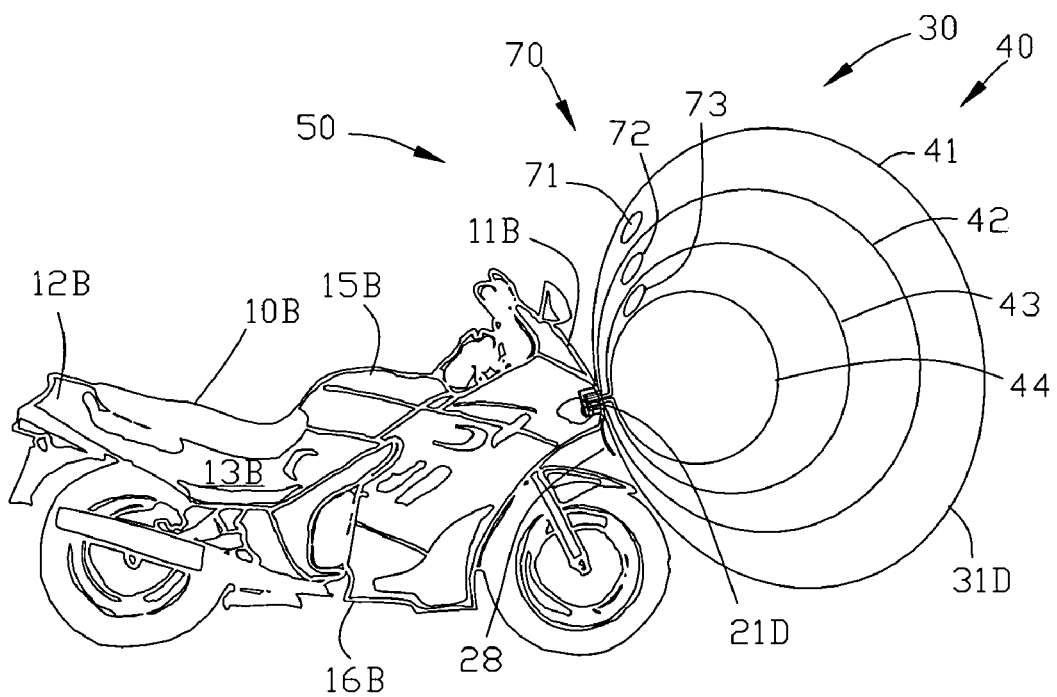
FIG. 21 is a side view of a motorcycle incorporating the pre-impact inflation air bag system of the present invention.

FIG. 21 is a side view of a motorcycle 10B incorporating the pre-impact inflation air bag system 5 of the present invention. In this example, a fourth inflatable air bag 44 is disposed within the third inflatable air bag 43. The fourth inflatable air bag 44 being the innermost airbag is void of a pressure relief member 70. The first, second, and third inflatable air bags 41–43 are provided with pressure relief members 71–73.

Figure 22:
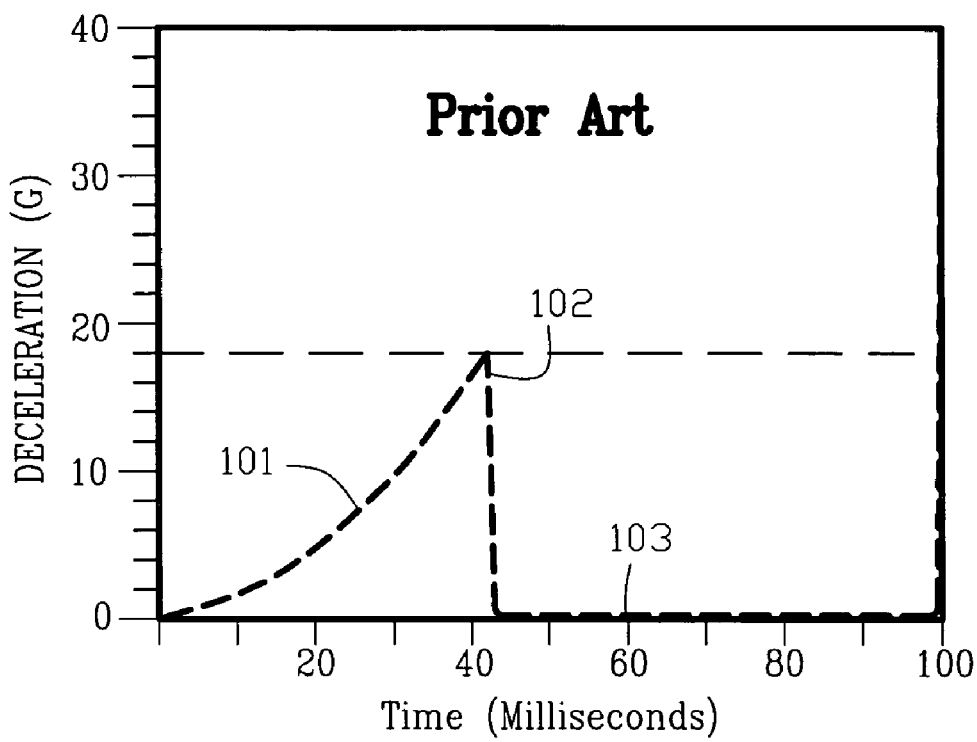
FIG. 22 is a graph of deceleration as a function of time for an inflatable air bag system of the prior art.

FIG. 22 is a graph of deceleration as a function of time for a single inflatable air bag system of the prior art. As the single inflatable airbag makes contact and is compressed by the object, the prior art single inflatable airbag system decelerates the vehicle as shown as 101. The deceleration of the vehicle continues until the prior art single inflatable airbag ruptures due to excessive pressure as shown as 102.

After the rupturing of the prior art single inflatable airbag of the prior art, the single inflatable air bag system of the prior art provides no further deceleration as shown as 103.

Figure 23:
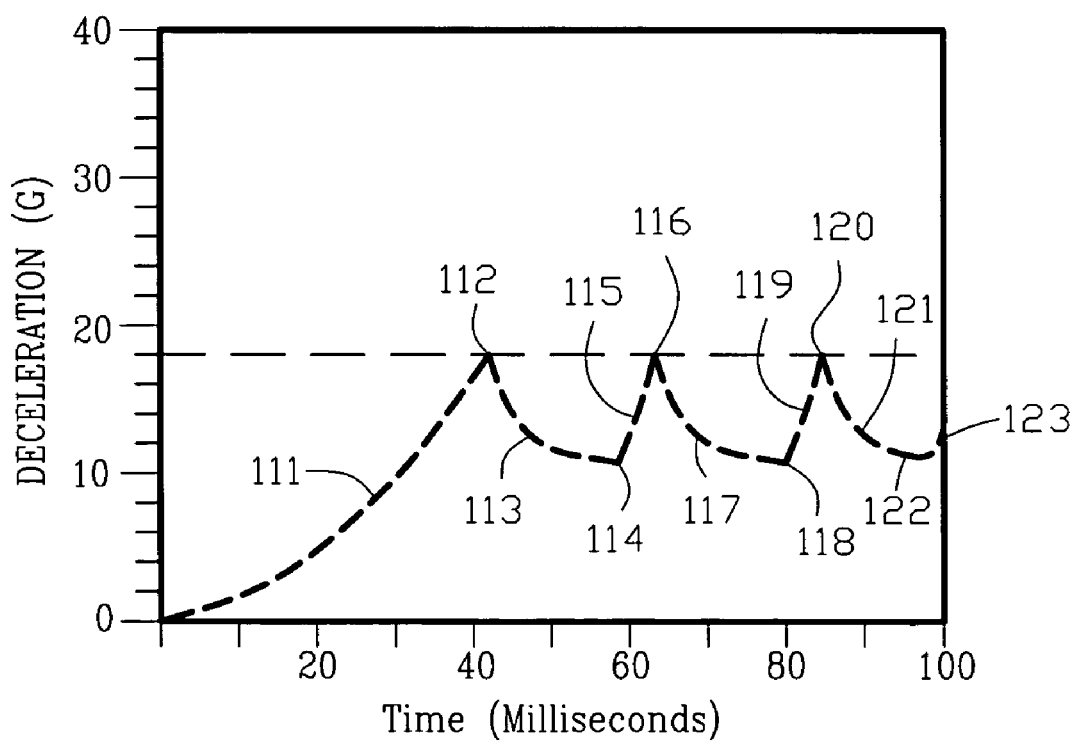
FIG. 23 is a graph of deceleration as a function of time for the pre-impact inflation air bag system of the present invention.

FIG. 23 is a graph of deceleration as a function of time for the pre-impact inflation air bag system 5 of the present invention. In this example, the pre-impact inflation air bag system 5 of the present invention incorporates four inflatable air bags as shown with reference to FIG. 21. As the first inflatable airbag 41 makes contact with and is compressed by the object 68, the vehicle is deceleration as shown as 111. The deceleration of the vehicle continues until the first inflatable airbag opens or ruptures due to excessive pressure as shown as 112. The deceleration of the vehicle is reduced as shown as 113 until the second inflatable airbag 42 makes contact with and is compressed by the object 68 as shown by 114. As the second inflatable airbag 42 is compressed by the object 68, the vehicle is deceleration as shown as 115. The deceleration of the vehicle continues until the second inflatable airbag opens or ruptures due to excessive pressure as shown as 116.

The deceleration of the vehicle is reduced as shown as 117 until the third inflatable airbag 43 makes contact with and is compressed by the object 68 as shown by 118. As the third inflatable airbag 43 is compressed by the object 68, the vehicle is deceleration as shown as 119. The deceleration of the vehicle continues until the third inflatable airbag opens or ruptures due to excessive pressure as shown as 120. The deceleration of the vehicle is reduced as shown as 121 until the fourth inflatable airbag 43 makes contact with and is compressed by the object 68 as shown by 122. As the fourth inflatable airbag 42 is compressed by the object 68, the vehicle is decelerated as shown as 123.

Figure 24:
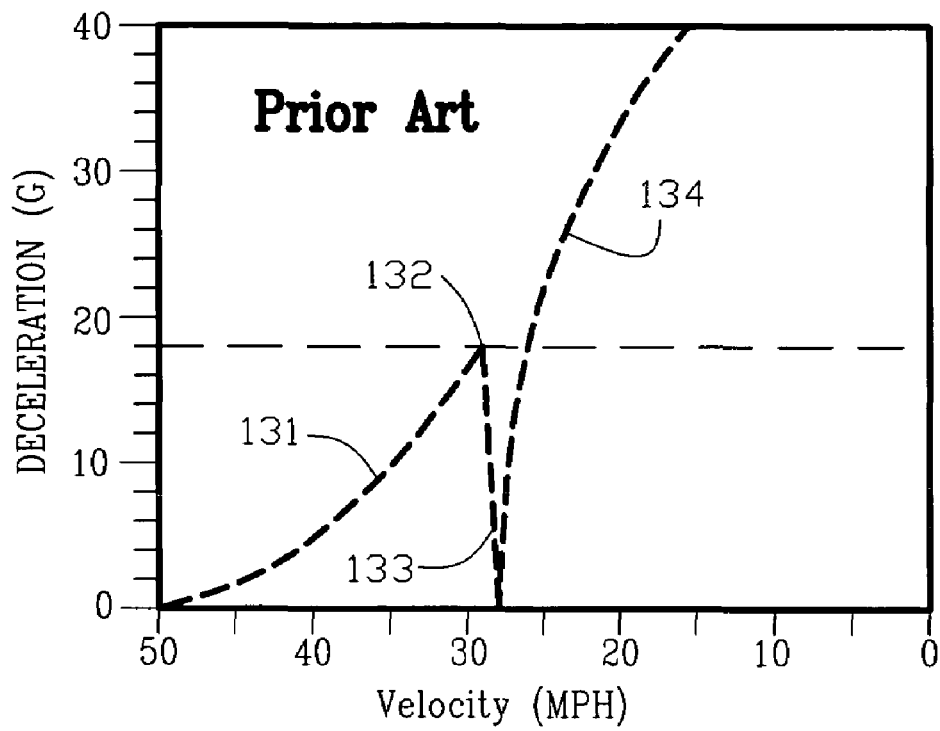
FIG. 24 is a graph of deceleration as a function of velocity for an inflatable air bag system of the prior art.

FIG. 24 is a graph of deceleration as a function of velocity for a single air bag system of the prior art. As the single inflatable airbag makes contact and is compressed by the object, the prior art single inflatable airbag system decelerates the vehicle as shown as 131. The deceleration of the vehicle continues until the prior art single inflatable airbag ruptures due to excessive pressure as shown as 132. After the rupturing of the prior art single inflatable airbag of the prior art, the single inflatable air bag system of the prior art provides no further deceleration as shown as 133. Final deceleration of the vehicle takes place when the vehicle impacts the object as shown as 134.

Figure 25:
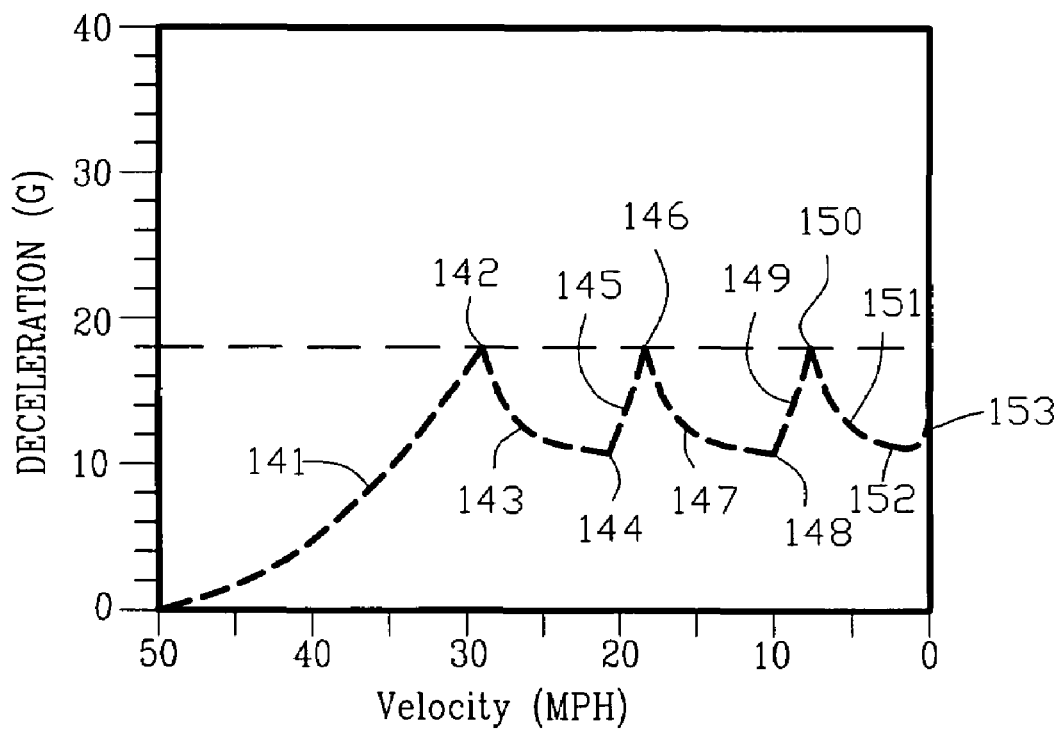
FIG. 25 is a graph of deceleration as a function of velocity for the pre-impact inflation air bag system of the present invention.

FIG. 25 is a graph of deceleration as a function of velocity for the pre-impact inflation air bag system 5 of the present invention. In this example, the pre-impact inflation air bag system 5 of the present invention incorporates four inflatable air bags as shown with reference to FIG. 21. As the first inflatable airbag 41 makes contact with and is compressed by the object 68, the vehicle is deceleration as shown as 141. The deceleration of the vehicle continues until the first inflatable airbag opens or ruptures due to excessive pressure as shown as 142. The deceleration of the vehicle is reduced as shown as 143 until the second inflatable airbag 42 makes contact with and is compressed by the object 68 as shown by 144. As the second inflatable airbag 42 is compressed by the object 68, the vehicle is deceleration as shown as 145. The deceleration of the vehicle continues until the second inflatable airbag opens or ruptures due to excessive pressure as shown as 146.

The deceleration of the vehicle 10 is reduced as shown as 147 until the third inflatable airbag 43 makes contact with and is compressed by the object 68 as shown by 148. As the third inflatable airbag 43 is compressed by the object 68, the vehicle 10 is decelerated as shown as 149. The deceleration of the vehicle 10 continues until the third inflatable airbag opens or ruptures due to excessive pressure as shown as 150. The deceleration of the vehicle 10 is reduced as shown as 151 until the fourth inflatable airbag 43 makes contact with and is compressed by the object 68 as shown by 152. As the fourth airbag 44 is compressed by the object 68, the vehicle 10 is decelerated as shown as 153. The fourth inflatable airbag 44 continues to be compressed and deformed between the vehicle 10 and the object 68 until the velocity of the vehicle 10 is reduced to a low speed within the safe parameters of the shock absorbing bumper designs of the vehicle 10. When the vehicle 10 strikes the object below the safe parameters of the shock absorbing bumper designs of the vehicle 10, little of no damage or injury is realized by the vehicle or the occupants therein.

The graphs of FIGS. 23 and 25 illustrate that the pre-impact inflation air bag system 5 of the present invention provides maximum deceleration of the vehicle while maintaining the deceleration under the safe limit of 18 g's. The pre-impact inflation air bag system 5 of the present invention provides continued deceleration during the rupturing of the first, second and third air bags 41–43. The pressure relief members 71–73 of the first, second and third air bags 41–43 are specifically designed to open or rupture to limit the deceleration of the vehicle to be under the 18 g's. A deceleration of 18 g's is believed to be the safe limit to avoid injury to human organisms.

Figure 26:
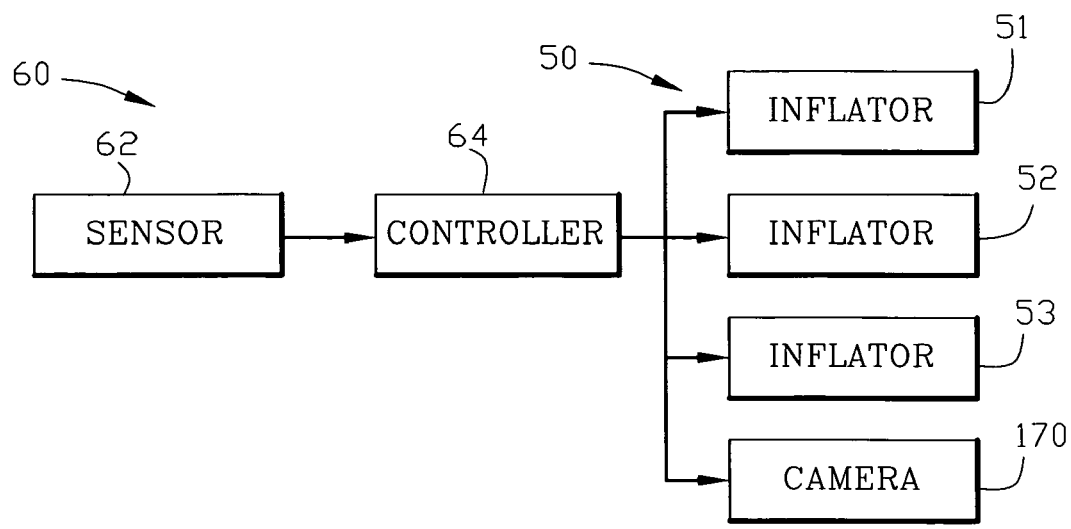
FIG. 26 is a block diagram illustrating the interconnection of a sensor, a controller, an inflator and a camera of the pre-impact inflation air bag system.

FIG. 26 is a block diagram of a circuit 60A illustrating the interconnection of the sensor 62, a controller 64, inflators 51–53 and a camera 170 of the pre-impact inflation air bag system 5. Upon the sensor 62 sensing preselected decreasing distance between the vehicle 10 and an object 68 as shown in FIG. 11, the controller 64 individually and simultaneously ignites the plurality of inflators 51–53. In addition, the controller 64 actuates the camera 170 for imaging the area about the vehicle 10.

Figure 27:
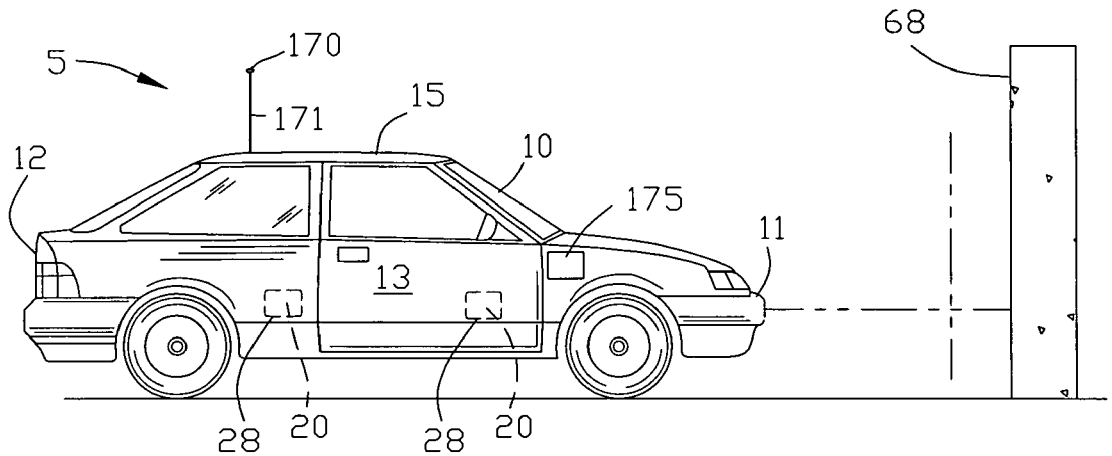
FIG. 27 illustrates the vehicle of FIG. 1 approaching an object at a velocity sufficient to actuate the pre-impact inflation air bag system.

FIG. 27 illustrates the vehicle 10 of FIG. 1 approaching an object at a velocity sufficient to actuate the pre-impact inflation air bag system. The vehicle 10 is provided with a camera 170 mounted on an upstanding support 171. The camera 170 may be mounted upon the upstanding support 171 as shown or may be mounted internally within the vehicle 10 with an optical lens system directing an image toward the camera 170. The camera 170 is connected to a recorder 175 for recording the images from the camera 170.

Figure 28:
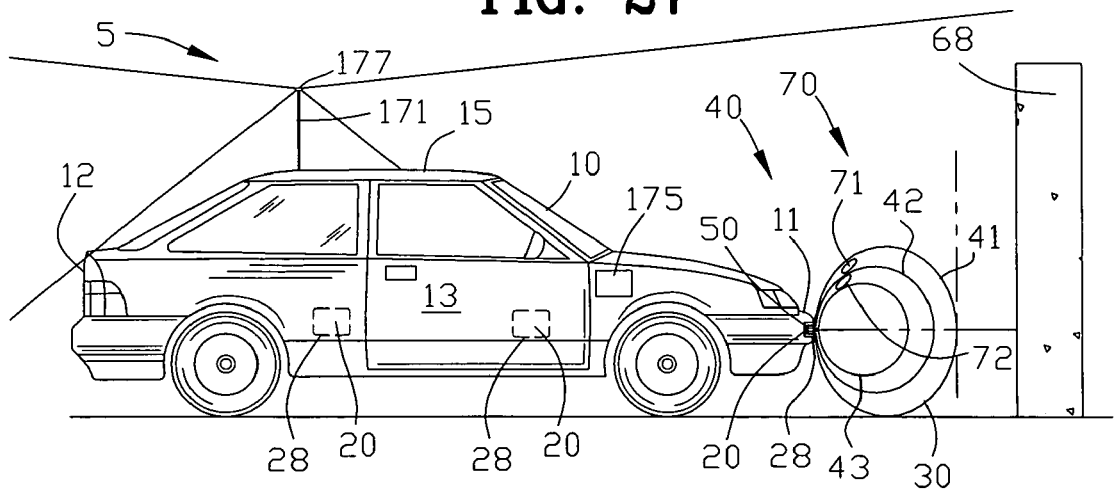
FIG. 28 is a view similar to FIG. 27 illustrating the actuation of a camera.

FIG. 28 is a view similar to FIG. 27 illustrating the actuation of a camera 170. Preferably, the camera 170 is a rapid sequence camera having a high image rate. The recorder 175 records the images from the camera 170 of the region around the vehicle 10 just prior to impact with the object 68. Preferably, the recorder 175 comprises a continuous loop recorder. The recorder 175 may also record other parameters such as a vehicle speed, time of day, deceleration and the like. The recorder 175 may resemble the well known "black box" used in aircraft.

The size of the air bags 40 depends largely on the size and type of the vehicle 10, the location of occupants, and the forces of impact. Generally, the size of the air bags 40 can be estimated from physical principles discussed herein. It has been calculated that 50 cubic feet of inflated specific fabric that he used or approximately 67 square feet can be folded in about one cubic foot of space.

The shape of the air bag 40 depends on the on the shape, size and type of the vehicle, the location of occupants, and the forces of impact. The drawings showing spherical shapes are for demonstration purposes, and may be oval, rectangular, cubical, or other shapes to provide maximum protection against impact.

The design of the plurality of nested air bags 40 within the same space allows distribution of the force of the impact over the entire surface of the air bags 40. The air bags 40 within each location or chamber inflate simultaneously. The outer inflated air bag 41 has the largest radius, and the inflated innermost air bag has the smallest radius 44. If the outer air bag has a capacity of 500 liters, and the adjacent inner bag has a capacity of 400 liters, then the outside air bag would need only 100 liters of gas to inflate assuming simultaneous inflation of all air bags. In addition, if the outer air bag has a capacity of 500 liters, the innermost air bag may have a capacity of 100 liters assuming 5 air bags per compartment.

According to the La Place Law of physics, applied to spherical objects, the tension in the wall of the air bag 40 is directly proportional to the pressure times the radius and inversely proportional to the thickness of the fabric. At impact, the force applied to the air bags 40 will be transmitted to all layers of air bags 40 contained within, with the pressure being equally distributed over the entire surface of the airbags according to the La Place law. Since the outer air bag 41 has a larger radius than the adjacent inner air bag 44, the tension within the outer air bag 41 will rise to a greater degree than the inner air bags 44. This is due to the fact that the air bag 40 with the larger radius will have higher tension due to a larger radius. As the pressure inside the air bag rises during impact, the air bags have a safety mechanism of deflation if the pressure inside the individual air bag exceeds a pre-determined threshold to minimize rapid deceleration. Thus the first air bag to rupture or deflate is the outermost bag due to the higher tension within the wall of the air bags.

The present invention overcomes the limitations of prolonged inflation times of the prior art. The plurality of the nested airbags 40 provide larger surface areas with less volume of inflation and therefore less time to inflate. For example, if it takes 200 milliseconds to inflate a 50 cubic foot air bag, with a surface area of 67 square feet, it will take 20 milliseconds to inflate multiple overlapping bags with the same combined surface areas, due to less volume of inflation. This assumes that all air bags within the outer air bag will inflate at about the same time.

Table 1 lists the radii of airbags in comparison to the surface areas and volumes. An airbag volume of 50 cubic feet to provide adequate protection against collisions of a vehicle weighing 3000 pounds colliding at speeds of 45 mph requires 200 milliseconds to inflate. With the current design, one can inflate 80 square foot area of airbags within 20 milliseconds using 4 bags with radii of 1 foot and 6 inches, 1 foot and 4 inches, 1 foot and 2 inches and 1 foot. The maximum volume of gas to be inflated is 5 cubic feet per bag.

TABLE 1

Radii of airbags in relation to surface area, volume and the volume of gas needed for inflation.

| Radius (feet) | Surface area (ft$^2$) | Volume (ft$^3$) | delta Volume (ft$^3$)* |
|---|---|---|---|
| 3'0" | 113 | 113 | 18 |
| 2'10" | 101 | 95 | 16 |
| 2'8" | 89 | 79 | 14 |
| 2'6" | 79 | 65 | 12 |
| 2'4" | 68 | 53 | 10 |
| 2'2" | 59 | 43 | 10 |
| 2'0" | 50 | 33 | 7 |
| 1'10" | 42 | 26 | 7 |
| 1'8" | 35 | 19 | 7 |
| 1'6" | 28 | 14 | 5 |
| 1'4" | 22 | 10 | 4 |
| 1'2" | 17 | 7 | 3 |
| 1'0" | 13 | 4 | 3 |
| 10" | 9 | 2 | 2 |
| 8" | 6 | 1 | 1 |
| 6" | 3 | 0.5 | 0.5 |

*denotes the volume of inflation of the outer minus the adjacent inner airbag

The prior art has shown, for safe deceleration of 100,000 pound truck or a 30,000 pound bus to occur, it may require an airbag with 30 and 10 times, respectively, the size of a 50 cubic foot (or 67 square feet) airbag to inflate before impact. Thus, an exterior air bag using the design of the prior art has to have an inflated volume of 1,500 cubic feet or an area of 2010 square feet for 100,000 pound truck, and 500 cubic feet or 670 square feet for a 30,000 pounds bus. These massive air bags may not be practical to implement. However, with the current overlapping air bag design, 9 overlapping air bags with a radius of 5 feet for the outer bag and eight other bags with radius that decreases by 2 inches per bag will have total surface area of 2146 square feet which would provide adequate deceleration for a 100,000 pound truck. Similarly for a 30,000 pounds bus, six overlapping air bags with a maximum radius of 3 feet and 6 inches for the outer bag and 5 other bags with a radius that decreases by 2 inches provides an overall area of 975 square feet. Large size airbags may be particularly useful for safe deceleration for large watercrafts and aircrafts.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A pre-impact inflation air bag system for a vehicle having a preselected decreasing distance between the vehicle and an object, comprising:
a plurality of nested inflatable air bags;
an enclosure located on the vehicle for containing said plurality of nested inflatable air bags;
a plurality of inflators for inflating said plurality of nested inflatable air bags, respectively;
a collision sensor for producing a collision sensor output upon detecting the object with the preselected decreasing distance between the vehicle and the object;
a controller receiving said collision sensor output for simultaneously inflating each of said plurality of nested inflatable air bags between vehicle and an object; and
a plurality of pressure relief members connected to said plurality of nested inflatable air bags for sequentially deflating said plurality of nested inflatable air bags upon sequential impact of said plurality of nested inflatable air bags with the object.

2. A pre-impact inflation air bag system as set forth in claim 1, wherein said plurality of nested inflatable air bags comprises a second and a third inflatable air bag being located within a first inflatable air bag and with said third inflatable air bag being located within said second inflatable air bag.

3. A pre-impact inflation air bag system as set forth in claim 1, wherein said collision sensor for detecting the object comprises a radar sensor for sensing a preselected decreasing distance between the vehicle and the object.

4. A pre-impact inflation air bag system as set forth in claim 1, wherein said collision sensor for detecting the object comprises a laser sensor for sensing a preselected decreasing distance between the vehicle and the object.

5. A pre-impact inflation air bag system as set forth in claim 1, wherein said collision sensor for detecting the object comprises an ultrasonic sensor for sensing a preselected decreasing distance between the vehicle and the object.

6. A pre-impact inflation air bag system as set forth in claim 1, wherein said collision sensor for detecting the object comprises a mechanical sensor for sensing a preselected decreasing distance between the vehicle and the object.

7. A pre-impact inflation air bag system as set forth in claim 1, wherein said collision sensor for detecting the object comprises a road proximity sensor for detecting a preselected increasing distance between the vehicle and a road surface.

8. A pre-impact inflation air bag system as set forth in claim 1, wherein said collision sensor for detecting the object comprises a tilt sensor for sensing a preselected increasing distance between the vehicle and the object.

9. A pre-impact inflation air bag system as set forth in claim 1, wherein including an immersion sensor for producing an immersion sensor output upon detecting the immersion of a portion of the vehicle within water; and
said controller receiving said immersion sensor output for simultaneously inflating each of said plurality of nested inflatable air bags to provide flotation for the vehicle.

10. A pre-impact inflation air bag system as set forth in claim 1, wherein each of said plurality of nested inflatable air bags are individually and simultaneously inflated by each of said plurality of inflators, respectively upon receipt of said sensor output from said controller.

11. A pre-impact inflation air bag system as set forth in claim 1, wherein said plurality of pressure relief members comprise a plurality of rupture devices cooperating with said plurality of nested inflatable air bags, respectively; and
each of said rupture devices rupturing at predetermined differential pressures for deflating said plurality of nested inflatable air bags upon impact of each of said plurality of nested inflatable air bags with the object, respectively.

12. A pre-impact inflation air bag system as set forth in claim 1, wherein said plurality of pressure relief members comprises each of said plurality of nested inflatable air bags having a specifically designed burst pressure for rupturing said plurality of nested inflatable air bags at a predetermined differential pressure, respectively.

13. A pre-impact inflation air bag system as set forth in claim 1, wherein said plurality of pressure relief members comprise a plurality of rupture devices cooperating with said plurality of nested inflatable air bags, respectively; and
each of said rupture devices rupturing at differential pressure less than 18 times the force of gravity (18 g) for deflating said plurality of nested inflatable air bags upon impact of each of said plurality of nested inflatable air bags with the object, respectively.

14. A pre-impact inflation air bag system as set forth in claim 1, wherein said plurality of pressure relief members comprise a plurality of rupture devices cooperating with said plurality of nested inflatable air bags, respectively;
each of said rupture device rupturing at predetermined differential pressures for deflating said plurality of nested inflatable air bags upon impact of each of said plurality of nested inflatable air bags with the object, respectively; and
an outer inflatable air bag of said plurality of nested inflatable air bags rupturing prior to an inner inflatable air bag of said plurality of nested inflatable air bags for providing a sequential deflation of said plurality of nested inflatable air bags upon sequential impact of said plurality of nested inflatable air bags with the object.

15. A pre-impact inflation air bag system as set forth in claim 1, wherein each of said plurality of pressure relief members comprises a frangible seam in each of said plurality of nested inflatable air bags.

16. A pre-impact inflation air bag system as set forth in claim 1, wherein each of said plurality of pressure relief members comprises a frangible region in each of said plurality of nested inflatable air bags.

17. A pre-impact inflation air bag system as set forth in claim 1, wherein each of said plurality of pressure relief members comprises a frangible closure in each of said plurality of nested inflatable air bags.

18. A pre-impact inflation air bag system for a vehicle having a preselected decreasing distance between the vehicle and an object, comprising:
a plurality of nested inflatable air bags comprising a first inflatable air bag, a second inflatable airbag and a third inflatable air bag;
said plurality of inflatable air bags being disposed in a nested relationship with said second and third inflatable air bags being located within said first inflatable air bag and with said third inflatable air bags being located within said second inflatable air bag;
an enclosure located on the vehicle for containing said plurality of nested inflatable air bags;
a plurality of inflators comprising a first through fourth inflator for inflating said first through fourth inflatable air bag, respectively;
a sensor for producing a sensor output upon detecting the object with the preselected decreasing distance between the vehicle and the object;
a controller receiving said sensor output for enabling said first through fourth inflator to individually and simultaneously inflate said first through fourth inflatable air bags, respectively, between vehicle and an object; and
a plurality of pressure relief members deflating said plurality of nested inflatable air bags upon impact of each of said plurality of nested inflatable air bags with the object, respectively wherein said first inflatable air bag deflates prior to said second inflatable air bag and said second inflatable air bag deflates prior to said third inflatable air bag.

19. A pre-impact inflation air bag system as set forth in claim 18, wherein each of said plurality of pressure relief members is actuated as the deceleration force of the vehicle less than eighteen time the force of gravity (18 g).

20. A pre-impact inflation air bag system as set forth in claim 18, wherein including a fourth inflatable air bag being disposed within said third inflatable air bag; and
said fourth inflatable air bag being void of a pressure relief member for enabling said fourth inflatable air bag to provide flotation for the vehicle.

21. A pre-impact inflation air bag system as set forth in claim 18, including an immersion sensor for producing an immersion sensor output upon detecting the immersion of a portion of the vehicle within water; and
said controller receiving said immersion sensor output for simultaneously inflating each of said plurality of nested inflatable air bags to provide flotation for the vehicle in the water.

* * * * *